US006710818B1

(12) United States Patent
Kasahara et al.

(10) Patent No.: US 6,710,818 B1
(45) Date of Patent: Mar. 23, 2004

(54) ILLUMINATION FLICKER DETECTION APPARATUS, AN ILLUMINATION FLICKER COMPENSATION APPARATUS, AND AN AC LINE FREQUENCY DETECTION APPARATUS, METHODS OF DETECTING ILLUMINATION FLICKER, COMPENSATING ILLUMINATION FLICKER, AND MEASURING AC LINE FREQUENCY

(75) Inventors: Misa Kasahara, Yokohama (JP); Kenji Tabei, Sagamihara (JP); Makoto Sube, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 387 days.

(21) Appl. No.: 09/680,216

(22) Filed: Oct. 6, 2000

(30) Foreign Application Priority Data

| Oct. 8, 1999 | (JP) | 11-288310 |
| Oct. 19, 1999 | (JP) | 11-297316 |
| Nov. 15, 1999 | (JP) | 11-324436 |

(51) Int. Cl.[7] ............................................. H04N 5/21
(52) U.S. Cl. .................... 348/607; 348/226.1; 348/619
(58) Field of Search ................................ 348/607, 447, 348/226.1, 227.1, 228.1, 910, 618, 619, 620, 602, 603

(56) References Cited

U.S. PATENT DOCUMENTS

| 4,774,588 A | * | 9/1988 | Noda et al. ................ 348/297 |
| 5,038,205 A | * | 8/1991 | Kondo et al. ............. 348/225.1 |
| 5,384,595 A | | 1/1995 | Sakaguchi |
| 5,501,518 A | * | 3/1996 | Woodward .................. 702/120 |
| 6,295,085 B1 | * | 9/2001 | Munson et al. .......... 348/226.1 |

FOREIGN PATENT DOCUMENTS

| EP | 0762742 | 3/1997 | | |
| JP | 62-134567 | 6/1987 | | |
| JP | 62134567 A | * 6/1987 | .......... | G01R/23/15 |
| JP | 63308484 A | * 12/1988 | .......... | H04N/5/335 |
| JP | 2-252371 | 10/1990 | | |
| JP | 6-303465 | 10/1994 | | |
| JP | 8-15324 | 2/1996 | | |
| JP | 8-265652 | 10/1996 | | |

\* cited by examiner

*Primary Examiner*—Michael H. Lee
(74) *Attorney, Agent, or Firm*—Louis Woo

(57) ABSTRACT

A video signal including illumination flicker component is integrated at each of unit areas (horizontal lines) in a frame (field) of the video signal. The integrated level at each of the unit areas at the frame and the integrated level at the corresponding unit area of an adjacent frame are averaged. Dividing is effected between results of the averaging and integrating every unit area. It is judged whether flicker exists in the video signal by frequency-analyzing results of the dividing result at the unit areas. The unit area may be plural adjacent lines where flickering are negligible. The averaging circuit may be circulation type of or FIR filter. Threshold level for judging the flicker is changed according to a shutter speed control signal. Flicker compensation may be executed by controlling shutter speed or the AGC according to flicker judging result. A still condition at a block in a frame may be detected from the integration result at plural frames. When the block is judged to be still, the flicker is judged. An ac line frequency detection is also disclosed to detect the frequency of the ac line from a video signal generated under illumination including flicker. An imaging circuit may be provided to generate the video signal therein.

44 Claims, 23 Drawing Sheets

COMPL COLOR FLT ARR

SUMMING BETWEEN TWO LINES
(Cy+Mg)+(Ye+G)+···
=2R+3G+2B≃Y+···

PRIMARY COLOR ARR

SUMMING BETWEEN TWO LINES
(R+G+G+B)+···
=R+2G+B≃Y+···

$$D3 = \frac{SUME_{n,i} + SUME_{n-1,i} + SUME_{n-2,i}}{AVE_{n,i} + AVE_{n-1,i} + AVE_{n-2,i}}$$

$$VB = \frac{1}{3} \times \left( \frac{SUM_{n,j}}{AVE_{n,j}} + \frac{SUM_{n,j+p}}{AVE_{n,j+p}} + \frac{SUME_{n,j+2p}}{AVE_{n,j+2p}} \right)$$

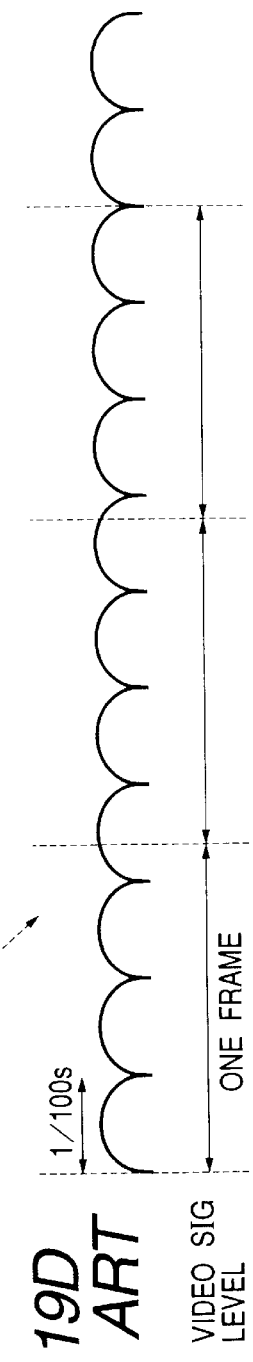
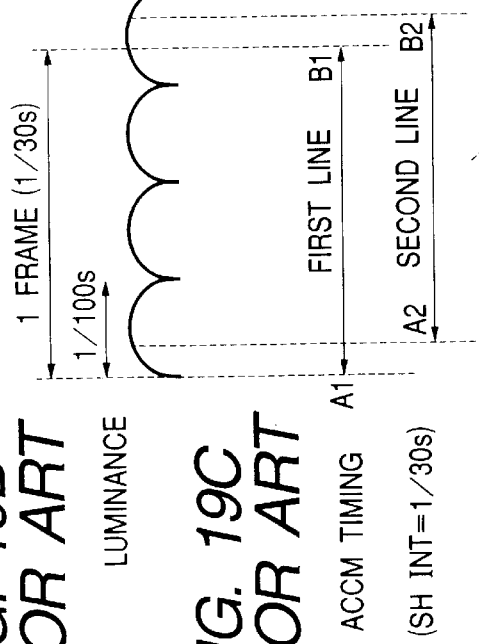
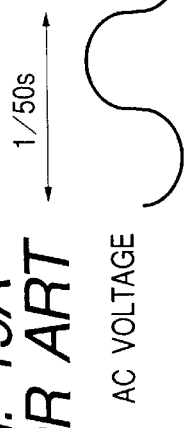
FIG. 19A PRIOR ART — AC VOLTAGE
FIG. 19B PRIOR ART — LUMINANCE
FIG. 19C PRIOR ART — ACCM TIMING (SH INT=1/30s)
FIG. 19D PRIOR ART — VIDEO SIG LEVEL

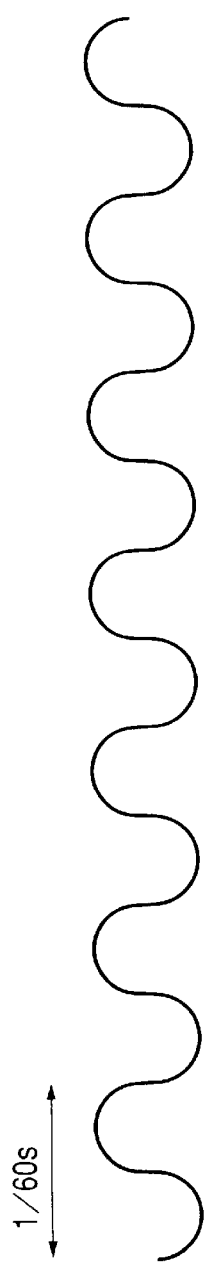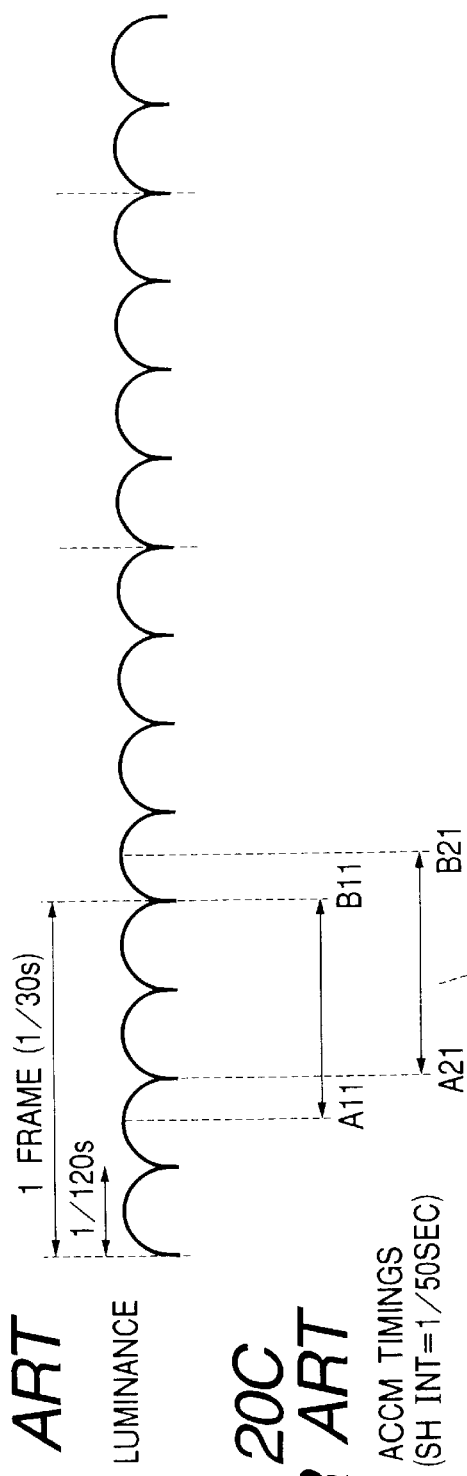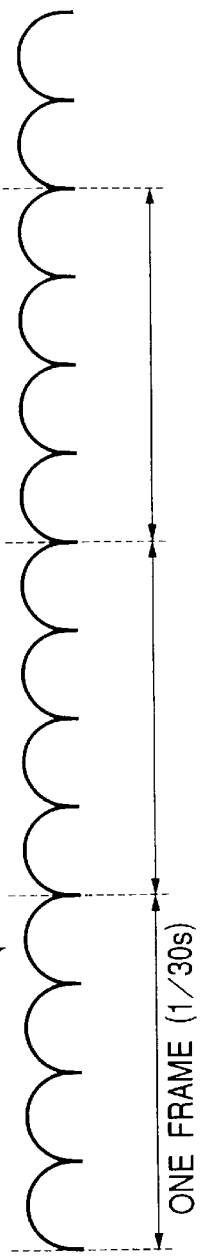
FIG. 20A PRIOR ART  AC VOLTAGE
FIG. 20B PRIOR ART  LUMINANCE
FIG. 20C PRIOR ART  ACCM TIMINGS (SH INT=1/50SEC)
FIG. 20D PRIOR ART  VIDEO SIG LEVEL $$AV_{n,i} = \frac{SUM_{n-1,i} + SUM_{n-2,i} + SUM_{n-3,i}}{3}$$

$$AV_{n,bi} = \frac{SUM_{n-1,bi} + SUM_{n-2,bi} + SUM_{n-3,bi}}{3}$$

$|B\text{-}SUM_{n,bj} - B\text{-}SUM_{n-1,bj}| \leq TH$

↓

STILL PORTION

ILLUMINATION FLICKER DETECTION APPARATUS, AN ILLUMINATION FLICKER COMPENSATION APPARATUS, AND AN AC LINE FREQUENCY DETECTION APPARATUS, METHODS OF DETECTING ILLUMINATION FLICKER, COMPENSATING ILLUMINATION FLICKER, AND MEASURING AC LINE FREQUENCY

BACKGROUND OF THE INVENTION

1. Field of the Invention

This invention relates to an illumination flicker detection apparatus, an illumination flicker compensation apparatus, and an ac line frequency detection apparatus, methods of detecting illumination flicker, compensating flicker, and measuring ac line frequency.

2. Description of the Prior Art

An illumination flicker detection apparatus for detecting flicker in a video signal which is generated by a video camera under illumination by fluorescent lamps are known. Moreover, a video signal processing apparatus for suppressing the affection by flicker in the video signal is also known.

When image is taken by a video camera under illumination by fluorescent lamps, there is a problem of flicker. Illumination level of the fluorescent lamp periodically changes with voltage variation of the ac line. FIGS. 19A to 19D are illustrations of a prior art showing a relation between luminance changes of fluorescent lamps and the image shooting operation. If the cycle of the voltage of ac line is 50 Hz as shown in FIG. 19A, the luminance of a fluorescent lamp changes at 100 Hz as shown in FIG. 19B.

FIG. 19C is an illustration showing operation of a prior art video camera. If a video camera or an electronic camera employing a MOS type of imager is used under illumination by fluorescent lamps at a shutter speed of 1/30 sec, charge storing timings and the luminance level of the video signal are shown in FIG. 19C.

The MOS type of imager outputs a first line from timing A1 to B1 and a second line from timings A2 to B2 which timings A2 and B2 are slightly shifted in time base from the timings A1 and B1 as shown in FIG. 19C. As shown in FIG. 19B, the luminance level changes, so that a luminance level of the image changes at a cycle of 1/100 sec, which is sensed by a watcher as black stripes on the reproduced image.

Particularly, in the case of the MOS type of imager, the reproduced image shows stripes over the to-be-reproduced image because the image storing timings are different with respect to the variation in the luminance of the fluorescent lamps every line.

FIGS. 20A to 20D are illustrations of a prior art showing a relation between luminance changes of fluorescent lamps and image shooting operation at 60 Hz. If the cycle of the voltage of ac line is 60 Hz as shown in FIG. 20A, the luminance of a fluorescent lamp changes at 120 Hz as shown in FIG. 20B.

FIG. 20C is an illustration showing operation of a prior art video camera. If a video camera or an electronic camera employing MOS type of imager is used under illumination by fluorescent lamps at a shutter speed of 1/50 sec, charge storing timings and the luminance level of the video signal are shown in FIG. 20C.

In the MOS type of imager, rays entering respective pixels on a first line are converted into charges which are accumulated from timings A11 to B11 and charges on a second line are accumulated from timings A21 to B21 which timings A21 and B21 are slightly shifted in time base from the timings A11 and B11. As shown in FIGS. 20B and 20C, the luminance level changes, so that brightness level of the shot image changes, which is sensed by a watcher as black stripes on the reproduced image.

In the case of 60 Hz, because the frame interval is an integer times the illumination level variation period, luminance level variation does not occur every frame. However, if the ac line frequency varies around 60 Hz, black stripes move every frame, so that quality of the reproduced image is deteriorated. In the MOS type of imager, charge accumulating timings are different from each other as similarly as the case of 50 Hz, so that the flicker occurs within one frame, which is sensed by watcher as black stripe on the reproduced image.

A prior art flicker compensating apparatus for compensating the video signal is also known. Japanese patent application provisional publication No. 8-15324 discloses such a flicker compensating apparatus. This flicker compensating apparatus detects the presence or absence of flicker by an integrating result of a video signal at the present field and an integrating result of the video signal at the previous field and comparing the difference between the present and the previous fields with a threshold level and switching the shutter speed in accordance with the presence and the absence of flicker.

SUMMARY OF THE INVENTION

The aim of the present invention is to provide superior illumination flicker detection apparatus, illumination flicker compensation apparatus and ac line frequency measuring apparatuses and superior methods of detecting illumination flicker, compensating flicker, and measuring ac line frequency.

According to the present invention, a first aspect of the present invention provides an illumination flicker detection apparatus comprising: integrating means for integrating levels of a video signal at pixels at each of unit areas included in a frame or field of said video signal; averaging means for averaging said integrated level at each of said unit areas at said frame or field and said integrated level at the corresponding unit area at an adjacent previous frame or field; dividing means for effecting division between results of said averaging and integrating means every unit area; and flicker judging means for judging whether flicker exists in said video signal by frequency-analyzing results of said dividing means at said unit areas and outputting a judging result.

Preferably, said unit area is a horizontal line.

Preferably, said unit area is a plurality of adjacent horizontal lines where variation in said levels due to said flicker is negligible.

Preferably, each of said unit areas includes a plurality of horizontal lines with interval at a frame, which horizontal line show the same phase in flicker component in said video signal.

Preferably, said averaging means comprising a circulation type of filter.

Preferably, said averaging means comprising a Finite Impulse Response filter.

Preferably, the illumination flicker detection apparatus further comprises: first summing means for summing said result of said integrating means at said frame or field and said result of said integrating means at another frame or field at every said unit area; and second summing means for summing said results of said averaging means at said frame or field and said result of said averaging means at said another frame or field at every unit area, wherein said another frame or field is prior to said frame or field by a predetermined number of frames or fields which is determined by a frequency of said flicker and a frame frequency of said video signal and said dividing means effects said division between said results of first and second summing means.

Preferably, the illumination flicker detection apparatus further comprises: first summing means for summing said results of said integrating means of a predetermined number of adjacent frames or fields at every unit area, said adjacent frames or fields including said frame or field; and second summing means for summing said results of said averaging means of said adjacent frames or fields at every unit area, wherein said dividing means effects said division between said results of first and second summing means.

Preferably, the illumination flicker detection apparatus, further comprises another averaging means for averaging said results of said dividing means at a plurality of said unit areas at said frame or field, wherein each of said unit areas includes a plurality of horizontal lines with interval at a frame, said horizontal lines showing the same phase in flicker component in said video signal.

Preferably, the illumination flicker detection apparatus, further comprises threshold level generating means for generating a threshold level in accordance with a shutter speed control signal which is used for generating said video signal, wherein said flicker judging means judges whether said flicker exists in said video signal using said threshold level.

According to the present invention, a second aspect of the present invention provides an illumination flicker compensation signal generation apparatus comprising: integrating means for integrating levels of a video signal at pixels at each of unit areas included in a frame or field of said video signal; averaging means for averaging said integrated level at each of said unit areas at said frame or field and said integrated level at the corresponding unit area at an adjacent frame or field; dividing means for effecting division between results of said averaging and integrating means every unit area; flicker judging means for judging whether flicker exists in said video signal by frequency-analyzing results of said dividing means at said unit areas and outputting a judging result; and flicker compensation means for generating a shutter speed control signal and an automatic gain controlling signal for generating said video signal in accordance with said judging result of said flicker judging means to compensate flicker in said video signal.

According to the present invention, a third aspect of the present invention provides a method of detecting flicker in a video signal comprising the steps of: (a) integrating video levels of a video signal at pixels at each of unit areas included in a frame or field of said video signal; (b) averaging said integrated level at each of said unit areas at said frame or field and said integrated level at the corresponding unit areas at an adjacent frame or field; (c) effecting division between results of said steps of (a) and (b) every unit area; and (d) judging whether flicker exists in said video signal by frequency-analyzing results of said step (c) at said unit areas and outputting a judging result.

According to the present invention, a fourth aspect of the present invention provides a method of compensating flicker in a video signal comprising the steps of: (a) integrating video levels of a video signal at pixels at each of unit areas included in a frame or field of said video signal; (b) averaging said integrated level at each of said unit areas at said frame or field and said integrated level at the corresponding unit areas at an adjacent frame or field; (c) effecting division between results of said steps of (a) and (b) every unit area; (d) judging whether flicker exists in said video signal by frequency-analyzing results of said step (c) at unit areas and outputting a judging result; and (e) generating a shutter speed control signal and an automatic gain controlling signal in accordance with said judging result of said step (d) to compensate flicker in said video signal.

According to the present invention, a fifth aspect of the present invention provides an illumination flicker detection apparatus comprising: integrating means for integrating levels of a video signal at pixels at each of unit areas included in a frame or field of said video signal; averaging means for averaging said integrated level at each of said unit areas at said frame or field and said integrated level at the corresponding unit area at an adjacent frame or field; still portion judging means for judging whether image at every block including a portion of said unit areas at a frame is still in accordance with result of said integrating means; dividing means for effecting division between results of said averaging and integrating means every unit area; and flicker judging means for judging whether flicker exists in said video signal in accordance with results of said dividing means and said still portion judging means.

Preferably, said unit area is a horizontal line.

Preferably, said unit area is a plurality of adjacent horizontal lines where variation of said video levels due to said flickering is negligible.

Preferably, said blocks are arranged in the vertical direction at a frame or a field, a vertical length of each block is determined in accordance with an integer times one cycle of illumination variation due to an ac line voltage, used for generating said video signal and a frame frequency of said video signal. Moreover, still portion judging means may comprise: summing means for summing integration results of unit areas at every said block; variation detection means for detecting variation in result of said summing means between each of said blocks of the present frame or field and the corresponding block of a previous frame or field; and comparing means for comparing said variation with a threshold value, wherein said still portion judging means judges that image at each of said blocks is still when said variation is lower than said threshold value.

In this case, said variation detection means may comprise: difference calculation means for calculating a difference in results of said summing means between each of said blocks of the present frame or field and the corresponding block of a previous frame or field; dividing means for dividing result of said difference calculating means by said result of said summing means of said present frame or field; and comparing means for comparing result of said dividing means with a threshold value, wherein said still portion judging means judges that image at each of said blocks is still when said result of said dividing means is lower than said threshold value. Preferably, said variation detection means comprises: variation detection averaging means for averaging results of said summing means between present and previous frames or fields at each of said blocks; difference calculation means for calculating a difference in result of said summing means and said result of said variation detection averaging means; dividing means for dividing result of said difference calculating means by said result of said summing means of said present frame or field; and comparing means for comparing result of said dividing means with a threshold value, wherein said still portion judging means judges that image at every block areas is still when said result of said dividing means is lower than said threshold value.

According to the present invention, a sixth aspect of the present invention provides an illumination flicker compensation signal generation apparatus comprising: integrating means for integrating levels of a video signal at pixels at each of unit areas included in a frame or field of said video signal; averaging means for averaging said integrated level at each of said unit areas at said frame or field and said integrated level at the corresponding unit area of at least an adjacent frame or field; still portion judging means for judging whether image at every block including a portion of said unit areas at a frame is still in accordance with result of said integrating means; dividing means for effecting division between results of said averaging and integrating means every unit area; flicker judging means for judging whether flicker exists in said video signal in accordance with results of said dividing means and said still portion judging means; and flicker compensation means for generating a shutter speed control signal and an automatic gain controlling signal for generating said video signal in accordance with said judging result of said flicker judging means to compensate flicker in said video signal.

According to the present invention, a seventh aspect of the present invention provides a method of compensating flicker in a video signal comprising the steps of: (a) integrating levels of a video signal at pixels at each of unit areas included in a frame or field of said video signal; (b) averaging said integrated level at each of said unit areas at said frame or field and said integrated level at the corresponding unit area at an adjacent frame or field; (c) judging whether image at every block including a portion of said unit areas is still in accordance with result of said step (a); (d) effecting division between results of said steps of (a) and (b) every unit area; and (e) judging whether flicker exists in said video signal in accordance with results of said steps (c) and (d).

According to the present invention, an eighth aspect of the present invention provides a method of compensating flicker in a video signal comprising the steps of: (a) integrating levels of a video signal at pixels at each of unit areas included in a frame or field of said video signal; (b) averaging said integrated level at each of said unit areas at said frame or field and said integrated level at the corresponding unit area at an adjacent frame or field; (c) judging whether image at every block including a portion of said unit areas is still in accordance with result of said step (a); (d) effecting division between results of said steps of (a) and (b) every unit area; and (e) judging whether flicker exists in said video signal in accordance with results of said steps (c) and (d); and (f) generating a shutter speed control signal and an automatic gain controlling signal for generating said video signal in accordance with said judging result of said step (e) to compensate flicker in said video signal.

According to the present invention, a ninth aspect of the present invention provides an ac line frequency detection apparatus comprising: flicker component detection means for detecting a flicker component in a video signal generated with illumination of which luminance varies with ac line voltage; and flicker judging means for judging whether flicker exists in said video signal in accordance with said detected flicker component and outputting the judging result.

Preferably, said flicker component detection means comprises: integrating means for integrating levels of said video signal at pixels at each of unit areas included in a frame or field of said video signal; averaging means for averaging said integrated level at each of said unit areas at said frame or field and said integrated level at the corresponding unit area at an adjacent frame or field; dividing means for effecting division between results of said averaging and integrating means every unit area to output said detected flicker component.

Preferably, said flicker judging means comprises: variation analyzing means for analyzing variation of said detected flicker component with respect to horizontal lines.

Preferably, said flicker judging means comprises: spectrum analyzing means for analyzing spectrum of said flicker component.

Preferably, said unit area is a horizontal line.

Preferably, the ac line frequency measuring apparatus further comprises: imaging means for generating a video signal with illumination of which luminance varies with ac line voltage.

According to the present invention, a ten aspect of the present invention provides a method of measuring an ac line frequency comprising the steps of: (a) detecting a flicker component in a video signal generated with illumination of which luminance varies with ac line voltage; and (b) judging whether flicker exists in said video signal in accordance with said detected flicker component.

BRIEF DESCRIPTION OF THE DRAWINGS

The object and features of the present invention will become more readily apparent from the following detailed description taken in connection with the accompanying drawings in which:

FIGS. 19A to 19D are illustrations of a prior art showing a relation between luminance changes of fluorescent lamps and the image shooting operation;

FIGS. 20A to 20D are illustrations of a prior art showing a relation between luminance changes of fluorescent lamps and image shooting operation at 60 Hz;

The same or corresponding elements or parts are designated with like references throughout the drawings.

DETAILED DESCRIPTION OF THE INVENTION

<FIRST EMBODIMENT>

Figure 1:
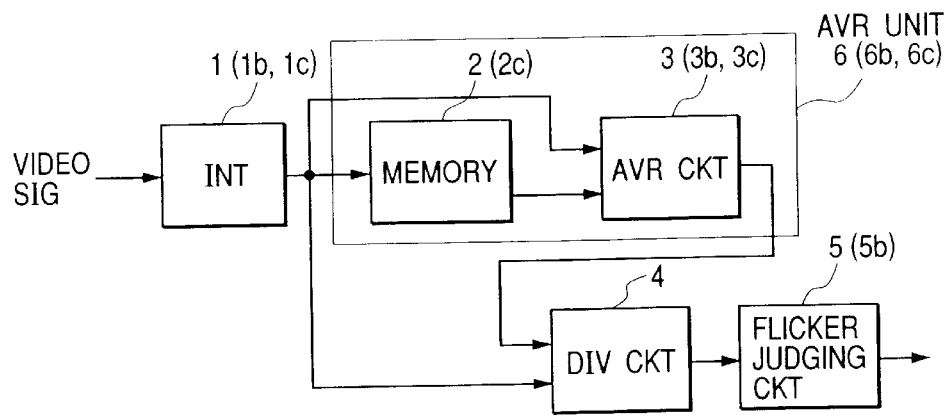
FIG. 1 is a block diagram of an illumination flicker detection apparatus according to this invention.

FIG. 1 is a block diagram of an illumination flicker detection apparatus according to this invention.

The illumination flicker detection apparatus includes an integrating circuit 1, an averaging unit 6 including a memory 2 and an averaging circuit 3, a dividing circuit 4, and a flicker judging circuit 5.

A video signal is inputted to the integrating circuit 1. The integrating circuit 1 integrates pixel levels of a video signal in every horizontal line (unit area) at a frame (field). The memory 2 stores the integration result over a plurality of frames (fields). The averaging circuit 3 averages the integration results of horizontal lines at a plurality of frames (fields) from the integration result from the integrating circuit 1 and the memory 2. The dividing circuit 4 divides the integration results of horizontal lines by the averaged result of horizontal lines, respectively. The flicker judging circuit 5 judges whether illumination flicker exists in the video signal by frequency-analyzing the dividing results of horizontal lines.

This illumination flicker detection apparatus is provided with a discrete circuit in this embodiment. However, the illumination flicker detection apparatus is also provided with a Digital Signal Processor (DSP), or a computer with a program.

The video signal is generated by a video camera (not shown in FIG. 1) under illumination of which luminance varies in accordance with the voltage change of the ac line. That is, an image of an object illuminated by fluorescent lamps is shot by the video camera.

Figure 2A:
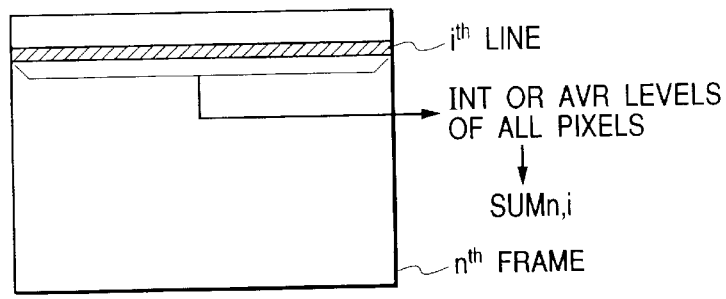
FIGS. 2A and 2B are illustrations of averaging operation, referred in the first, eleventh, and sixteen embodiments.
Figure 2B:
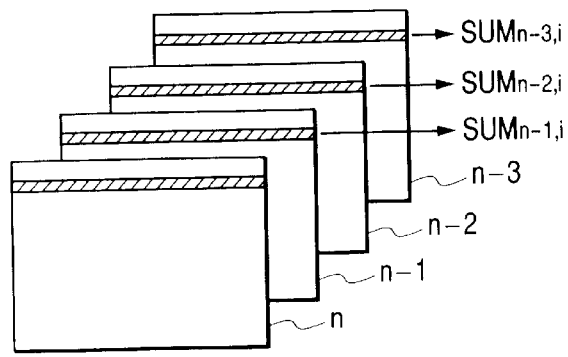

FIGS. 2A and 2B are illustration of the first embodiment.

The integration circuit 1 integrates, accumulates, or averages the pixel levels (luminance level) at every horizontal line (unit area). The integrating result of $i^{th}$ line of $n^{th}$ frame is represented by $SUM_{n,i}$ as shown in FIG. 2A. If one frame of the video signal includes 480 lines, the integration circuit 1 calculates the integration result $SUM_{n,1}$ to $SUM_{n,480}$ for i=1 to 480.

The memory 2 successively stores a predetermined number of frames (fields) of the integration result. The averaging circuit 3 effects addition or averaging among $SUM_{n,i}$ from the integration circuit 1, $SUM_{n-1,i}$, $SUM_{n-2,i}$, and $SUM_{n-3,i}$ from the memory 2. FIG. 2B shows the summing or averaging operation from the integration results of the present frame and the previous frames. The memory 2 stores the integration result $SUM_{n,i}$ and outputs the integration results $SUM_{n-1,i}$, $SUM_{n-2,i}$, $SUM_{n-3,i}$ at the $i^{th}$ line at frames n−1 to n−3. The averaging circuit 3 averages (sums) $SUM_{n,i}$, $SUM_{n-1,i}$, $SUM_{n-2,i}$, and $SUM_{n-3,i}$. That is, the averaging circuit 3 averages the integrated level at each of the unit areas at the present frame or field and the integrated level at the corresponding unit area at an adjacent previous frame or field. The averaging result is represented as $AVE_{n,i}$. In this embodiment, the number of the previous frames per one unit averaging operation is three. However, it is also possible that, at least, the integration results of more than one previous frames are added to the integration result of the present frame.

Figure 3:
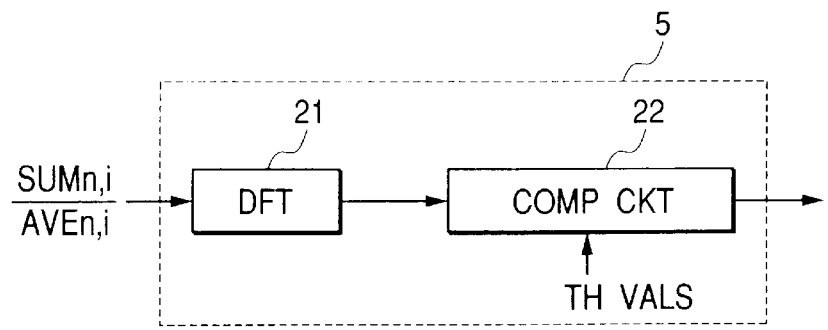
FIG. 3 is a block diagram of the flicker judging circuit referred in the first and eleven embodiments.

The dividing circuit 4 obtains $SUM_{n,i}/AVE_{n,i}$ through calculation from the output $SUM_{n,i}$ of the integration circuit 1 and the output $AVE_{n,i}$ of the averaging circuit 3. That is, the dividing circuit 4 effects division between results of the averaging and integration every unit area. The flicker judging circuit 5 judges whether there is flicker with the dividing result of the dividing circuit 4. FIG. 3 is a block diagram of the flicker judging circuit 5. The flicker judging circuit 5 includes a DFT (Discrete Fourier Transform) circuit 21 supplied with the division result $SUM_{n,i}/AVE_{n,i}$ and a comparing circuit 22 for comparing the output of the DFT circuit 21 with threshold values.

Figure 4A:
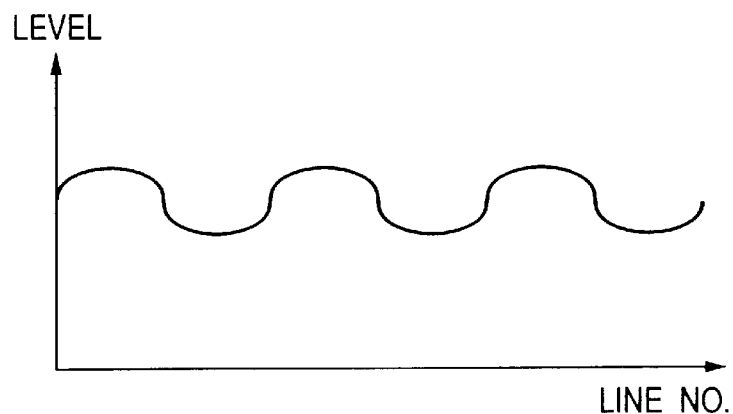
FIG. 4A is a graphical drawing, showing the output of the dividing circuit, referred in the first, eleventh, and eighteenth embodiments.

FIG. 4A is a graphical drawing showing the output of the dividing circuit 4 according to the first embodiment, wherein the axis of abscissas represents line number at a frame and the axis of ordinates represents levels of dividing results, that is, $SUM_{n,i}/AVE_{n,i}$. The dividing results shows flicker.

Figure 4B:
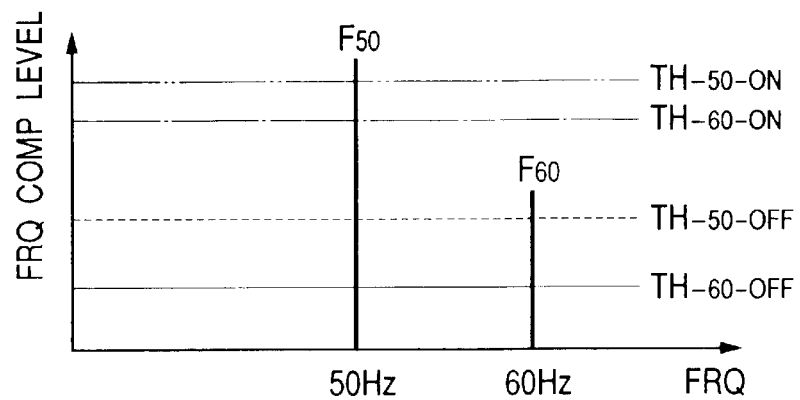
FIG. 4B is a graphical drawing, showing the output of the DFT circuit, referred in the first, eleventh, and eighteen embodiments.

FIG. 4B is a graphical drawing showing the output of the DFT circuit 21 according to the first embodiment, wherein the axis of abscissas represents frequency and axis of ordinates represents levels of frequency components.

The DFT circuit 21 effects Discrete Fourier Transform operation to output frequency components as shown in FIG. 4B from the division result of the division circuit 4.

The line $F_{50}$ represents the level of the DFT circuit 21 at 50 Hz, i.e., component of 50 Hz, and the line $F_{60}$ represents the level of the DFT circuit 21 at 60 Hz, i.e., component of 60 Hz.

The comparing circuit 22 compares the results $F_{50}$ and $F_{60}$ of the DFT circuit 21 with threshold levels $TH_{50\text{-}ON}$, $TH_{60\text{-}ON}$, $TH_{50\text{-}OFF}$, and $TH_{60\text{-}OFF}$. There are relations, $TH_{50\text{-}ON} > TH_{50\text{-}OFF}$ and $TH_{60\text{-}ON} > TH_{60\text{-}OFF}$.

Basically, the comparing circuit 22 compares the component $F_{50}$ with the threshold levels $TH_{50\text{-}ON}$ and $TH_{50\text{-}OFF}$ and the component $F_{60}$ with the threshold levels $TH_{60\text{-}ON}$ and $TH_{60\text{-}OFF}$ to detect flicker at 50 Hz and 60 Hz in the video signal.

More specifically, the comparing circuit 22 judges the flicker as follows:

When (the value of) $F_{50} < TH_{50\text{-}OFF}$ and (the value of) $F_{60} < TH_{60\text{-}OFF}$, the comparing circuit 22 judges that there is no flicker.

When $\alpha \times F_{60} < F_{50}$ and $F_{50} > TH_{50\text{-}ON}$, the comparing circuit 22 judges there is flicker of 50 Hz.

When $\beta \times F_{50} < F_{60}$ and $F_{60} > TH_{60\text{-}ON}$, the comparing circuit 22 judges there is flicker of 60 Hz.

In other cases, the comparing circuit 22 judges that it is unknown that there is flicker.

In the above equations, $\alpha$ is a weighting coefficient for flicker detection of 50 Hz and $\beta$ is a weighting coefficient for flicker detection of 60 Hz. These coefficients are sufficiently greater than one, so that if the frequency component $F_{50}$ ($F_{60}$) is greater than the value of the weighting-coefficient-times the frequency component $F_{60}$ ($F_{50}$), the comparing circuit 22 judges there is flicker of 50 Hz (60 Hz). This reduces probability of erroneous judgment of existence of flicker due to luminance level change within a frame representing an image.

As mentioned above, according to this embodiment, the existence of flicker is judged from the average of integration values over a plurality of frames (fields) including the present frame at the corresponding lines. Thus, the flicker detection can be provided without influence of luminance level variation due to motion of the image. Moreover, this structure (this method) provides illumination flicker detection of 60 Hz wherein luminance level variation.

In the first embodiment, the integration circuit 1 integrates the pixel values every horizontal line. However, it is also possible that the integration circuit 1 integrates the pixel value on thinned horizontal lines, wherein thinning period is sufficiently shorter than the period of flicker (beat) component. In this case, the circuit stage after the integration circuit 1 effects the above-mentioned operation for the thinned horizontal lines. Thus, the capacity of the memory 2 can be reduced.

<SECOND EMBODIMENT>

An illumination flicker detection apparatus according to a second embodiment has substantially the same structure as that of the first embodiment. The difference is that the integrating circuit 1b effects integration every a plurality of horizontal lines in which the flicker component level is considered to be substantially the same. That is, the video (luminance) levels of pixels are integrated or averaged every adjacent or consecutive three lines, $i^{th}$, $(i+1)^{th}$ line, and $(i+2)^{th}$ line and outputted.

Figures 5, 6A, 6B:
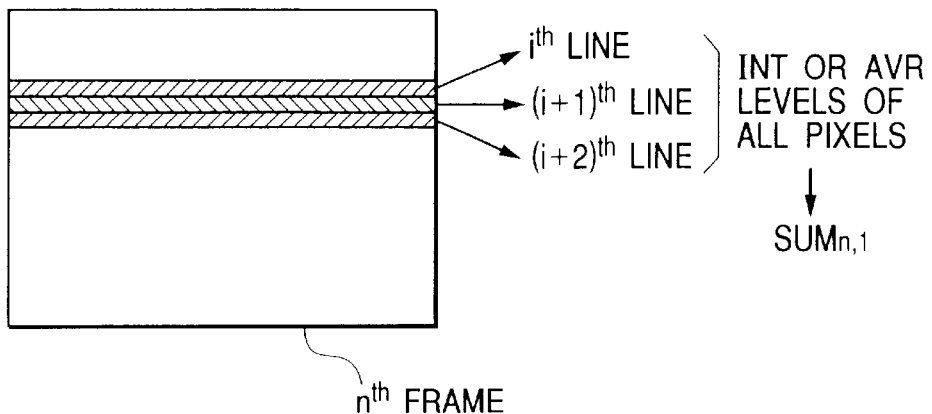
FIG. 5 is an illustration of integration operation according to a second embodiment.
FIGS. 6A and 6B show arrangements of color filters for single plate imagers and processing in the second embodiment.

FIG. 5 is an illustration of integration operation according to the second embodiment.

It is assumed that the integrated or averaged values of video levels of all significant pixels on the $i^{th}$ line, $(i+1)^{th}$ line, and $(i+2)^{th}$ line at $n^{th}$ frame are represented as $SUM_{nI}$ and that on the $(i+3)^{th}$ line, $(i+4)^{th}$ line, and $(i+5)^{th}$ line at $n^{th}$ frame is represented as $SUM_{nI+1}$.

This embodiment is effective for video signals obtained from imagers using color filters. FIGS. 6A and 6B show arrangements of color filters for single plate imagers and processing in this embodiment. The arrangement shown in FIG. 6A is for the complementary filter structure and the arrangement shown in FIG. 6B is a portion of Bayer arrangement for primary color filter structure. As shown in FIGS. 6A and 6B, different color filters are arranged and adhered on imagers.

In the complementary color filter type of imager, a first line and a second line are alternately arranged, wherein a cyan filter Cy and a yellow filter Ye are alternately arranged every pixel on the first line and a magenta filter Mg and a green filter are alternately arranged every pixel on the second line. In the integrating the video levels of pixels in two consecutive lines, four pixels surrounded with a chain line are dealt as one block. The video signal level in one block is represented as $$Cy+Mg+Ye+G=2R+3G+2B \approx Y$$

Then, the video signal level in one block provides substantially the same level as the luminance signal. This signal similar to the luminance signal is integrated and the integrated result is used for detecting flicker, so that accurate flicker detection is provided.

In the arrangement shown in FIG. 6B, one line where R and G filters are alternately arranged and another line where G and B filters are alternately arranged. In integration on these two lines, four pixels surrounded by a chain line are dealt as one block and values in a plurality of blocks are integrated. The video signal level in one block is represented as $$R+G+G+B=R+2G+B \approx Y$$

Thus, the video signal level in one block is substantially the same as the luminance signal Y. This video signal similar to the luminance signal is integrated every a plurality of horizontal lines (two lines), so that accurate flicker detection is provided.

As mentioned above, according to the second embodiment, the integration of video signal levels is effected every plural lines in which levels of flicker component can be considered as substantially the same. Thus, this structure reduces affection of luminance level variation of an object image, so that accurate flicker detection is provided.

<THIRD EMBODIMENT>

An illumination flicker detection apparatus according to a third embodiment has substantially the same structure as that of the first embodiment. The difference is that the integrating circuit 1c integrates the video levels of pixels on a plurality of horizontal lines which are apart from each other by a period in accordance with the flicker and frame frequencies.

Figure 7:
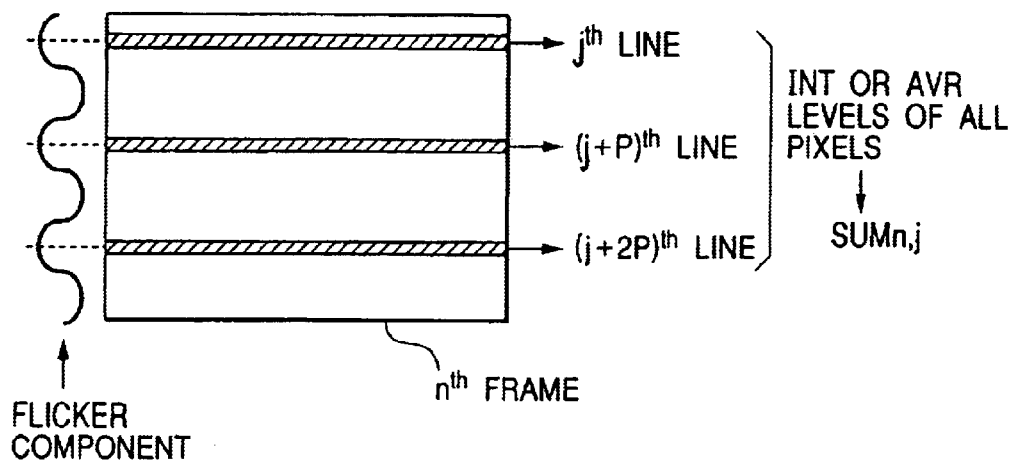
FIG. 7 is an illustration according to a third embodiment.

FIG. 7 is an illustration according to the third embodiment.

In the case that an image is shot under illumination using the ac line of 50 Hz, there are periodical level variations $(3+\frac{1}{3})$ times a frame as shown in FIG. 7. In the case of 60 Hz, there are four periodical level variations on a frame.

Then, the integrating circuit 1c integrates the video signal level on the horizontal lines (unit area) showing the same phase in the illumination flicker. That is, the integration circuit 1c integrates or averages video levels of pixels on the $j^{th}$ line, $(j+p)^{th}$ line, and $(l+2p)^{th}$ line. This level is represented as $SUM_{nj}$. The averaged value of the video levels of pixels on the $j^{th}$ $(j+1)^{th}$ line, $(j+1+p)^{th}$ line, and $(l+1+2p)^{th}$ line is represented as $SUM_{nj+1}$.

Each of the unit areas includes a plurality of horizontal lines with interval at a frame, which horizontal lines show the same phase in flicker component in said video signal. The number of the horizontal lines in each unit area is determined in accordance with the division of the flicker frequency (for example, 100 Hz) by the frame frequency (for example, 30 HZ) when the flicker frequency is indivisible by the frame frequency.

As mentioned above, in the third embodiment of this invention, the video signal levels are integrated every a plurality of horizontal lines showing the same phase in the beat frequency between the illumination flicker and the frame cycle. Moreover, the integrated values are averaged over a plurality of frames including the present frame and previous frames and the averaged values are used in judging whether flicker is present. Thus, variation in luminance due to the image of an object can be reduced, so that accurate illumination flicker detection is provided. Moreover, the number of integration result $SUM_{nj}$ is one third of the integration result $SUM_{ni}$ of the first embodiment. Thus, the capacity of the memory 2 can be reduced to one third.

<FOURTH EMBODIMENT>

An illumination flicker detection apparatus according to a fourth embodiment has substantially the same structure as that of the first embodiment. The difference is that the averaging circuit 3b is used instead the averaging circuit 3 of the first embodiment.

Figure 8:
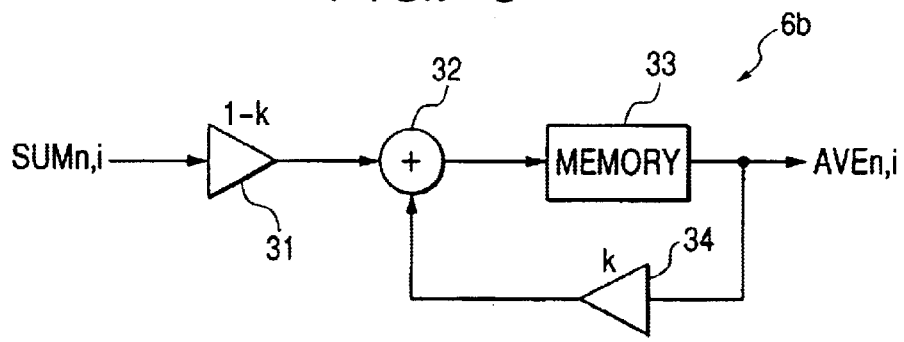
FIG. 8 is a block diagram of an averaging unit according to a fourth embodiment.

FIG. 8 is a block diagram of the averaging unit 6b according to the fourth embodiment.

The averaging unit 6b includes a multiplier 31, an adder 32, a memory 33, and a multiplier 34. The multiplier 31 multiplies the output $SUM_{n,i}$ of the integration circuit 1 by a coefficient (1−k). The adder 32 adds an output of the multiplier 34 to the output of the multiplier 31. The memory 33 temporarily stores the output of the adder 32. The multiplier 34 multiplies an output $AVE_{n,i}$ of the memory 33 by the coefficient k. The coefficient k is a predetermined circular coefficient, wherein $0 \leq k \leq 1$.

The multiplier 31 multiplies the output $SUM_{n,i}$ of the integration circuit 1 by (1−k) and supplies the result to the adder 32. The memory 33 stores one frame of the output of the adder 32 and outputs an averaged signal $AVE_{n,i}$ which is delayed by one frame from the output $SUM_{n,i}$. The multiplier 34 multiplies the averaged signal $AVE_{n,i}$ by k. The adder 32 adds the output $(1-k) \times SUM_{n,i}$ to the output $k \times AVE_{n,i}$ of the multiplier 34 and supplies the output to the memory 33.

Accordingly there is a relation between the input $SUM_{n,i}$ of the averaging unit 6b and the averaged signal as follows:

$$AVE_{n,i}=(1-k)\times SUM_{n,i}+k\times AVE_{n-1,i}=(1-k)\times SUM_{n,i}+k\times(10k)\times SUM_{n-1,i}+k^2\times(1-k)\times SUM_{n-2,i}+\ldots$$

As mentioned above, averaging has been effected over previous infinite frames with the circulation type of filter, so that dividing can be effected with stable values. Thus, illumination flicker detection is provided without affection due to luminance level variation due to motion of an object in the image.

<FIFTH EMBODIMENT>

An illumination flicker detection apparatus according to a fifth embodiment has substantially the same structure as that of the first embodiment. The difference is that the averaging unit 6c is used instead the averaging unit 6 of the first embodiment. The averaging unit 6c includes an FIR (Finite Impulse Response) filter.

Figure 9:
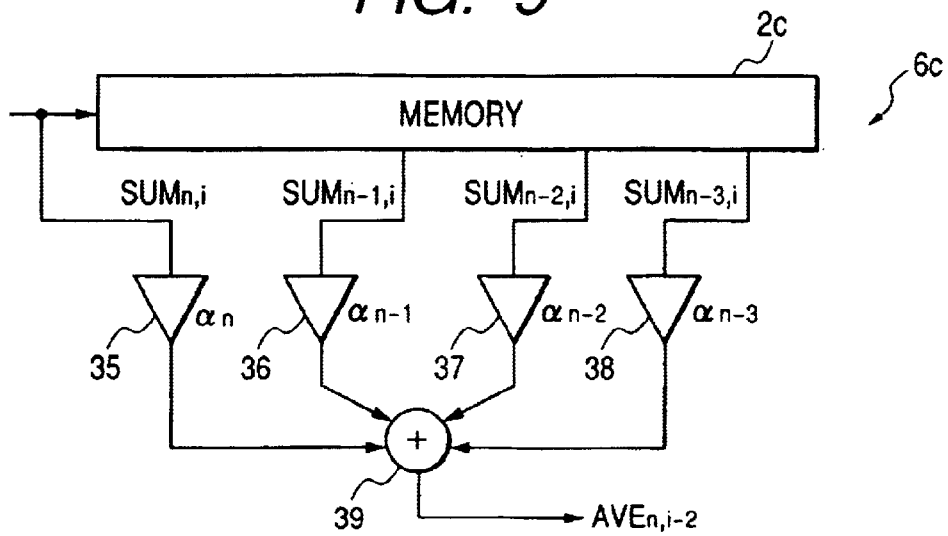
FIG. 9 is a block diagram of the averaging unit according to a fifth embodiment.

FIG. 9 is a block diagram of the averaging unit 6c according to the fifth embodiment. The averaging unit 6c includes a memory 2c, multipliers 35 to 38, and an adder 39 as an FIR filter.

The memory 2c outputs one-frame-delayed to three-frame-delayed integrated signals $SUM_{n-1, i}$, $SUM_{n-2, i}$, and $SUM_{n-3, i}$. The multiplier 35 multiplies the integrated signal $SUM_{n,i}$ by $\alpha_n$. The multiplier 36 multiplies the one-frame-delayed integrated signal $SUM_{n-1,i}$ by $\alpha_{n-1}$. The multiplier 37 multiplies the two-frame-delayed integrated signal $SUM_{n-2,i}$ by $\alpha_{n-2}$. The multiplier 38 multiplies the three-frame-delayed integrated signal $SUM_{n-3,i}$ by $\alpha_{n-3}$. The adder 39 effects addition among the outputs of the multipliers 35 to 38 and outputs an averaging result $AVE_{n,i-2}$. Accordingly, there is a relation between the input $SUM_{n,i}$ of the averaging unit 6c and the averaged signal $AVE_{n,i-2}$ as follows:

$$AVE_{n,i}=\alpha_n\times SUM_{n,i}+\alpha_{n-1}\times SUM_{n-1,i}+\alpha_{n-2}\times SUM_{n-2,i}+\alpha_{n-3}\times SUM_{n-3,i}.$$

In the case of 60 Hz illumination, if the frame period is $\frac{1}{30}$ sec, the flicker component every frame gradually changes. This FIR type of averaging unit 6c provides illumination flicker detection by obtaining the averaged signal $AVE_{n,i}$ from integration result $SUM_{n,i}$ including such gradual change in luminance due to flicker at 60 Hz by setting the coefficients $\alpha_n$, $\alpha_{n-1}$, $\alpha_{n-2}$, $\alpha_{n-3}$.

As mentioned above, according to the fifth embodiment, averaging is effected with the FIR filter, so that the integrated data can be averaged with a desired characteristic. Thus, accurate illumination flicker detection is provided.

<SIXTH EMBODIMENT>

An illumination flicker detection apparatus according to a sixth embodiment has substantially the same structure as that of the first embodiment. The difference is that the summing units 10a and 10b are further provided between the integration circuit 1 and the dividing circuit 4 and between the averaging circuit 3 and the dividing circuit 4, respectively.

Figure 10:
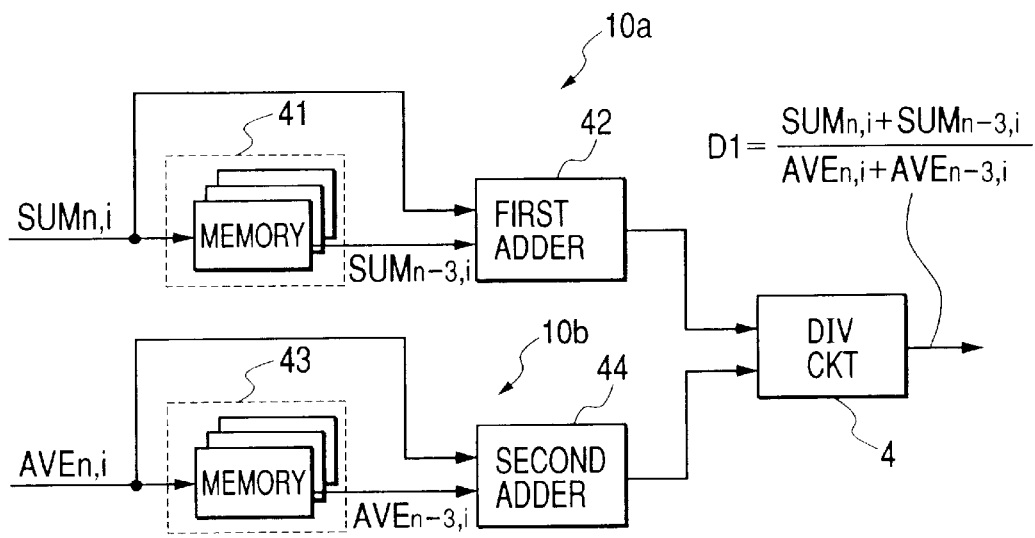
FIG. 10 is a block diagram of the summing units according to a sixth embodiment.

FIG. 10 is a block diagram of the summing units 10a and 10b according to the sixth embodiment.

The summing unit 10a includes a memory 41 storing the integrated signal $SUM_{n,i}$ and outputting a three-frame-delayed integrated signal $SUM_{n-3,i}$ and a first adder 42 for adding the three-frame delayed integrated signal $SUM_{n-3,i}$ to the integrated signal $SUM_{n,i}$ and supplies the adding result to the dividing circuit 4.

The summing unit 10b includes a memory 43 storing the averaged signal $AVE_{n,i}$ and outputting a three-frame-delayed averaged signal and an adder 44 for adding the three-frame delayed averaged signal $AVE_{n-3,\ i}$ to the averaged signal $AVE_{n,i}$ and supplies the adding result to the dividing circuit 4. The dividing circuit 4 divides the adding result from the adder 42 by that from the adder 44. Thus, the output of the dividing circuit 4 is represented by:

$$D1 = (SUM_{n,i} + SUM_{n-3,i})/(AVE_{n,i} + AVE_{n-3,i})$$

In the case of 50 Hz, if the frame period is $\frac{1}{30}$ sec, the flicker appears with the same pattern on every three frame. Thus, the integrated signal of the present frame is added to the integrated signal of the three-frame-delayed integrated signal and the averaged signal of the present frame is also added to the averaged signal of the three-frame-delayed averaged signal to remove the influence by the shot image of the object in the video signal.

In this example, the integrated signal $SUM_{n,i}$ and the averaged signal $AVE_{n,i}$ are added to three-frame-delayed integrate signal $SUM_{n-2,i}$ and to the three-frame delayed averaged sigil $AVE_{n-2,i,\ respectively}$. However, this is determined in accordance with the relation between the frequency of the ac line and the frame frequency of the video signal. Thus, this value is not limited to three.

Figure 11:
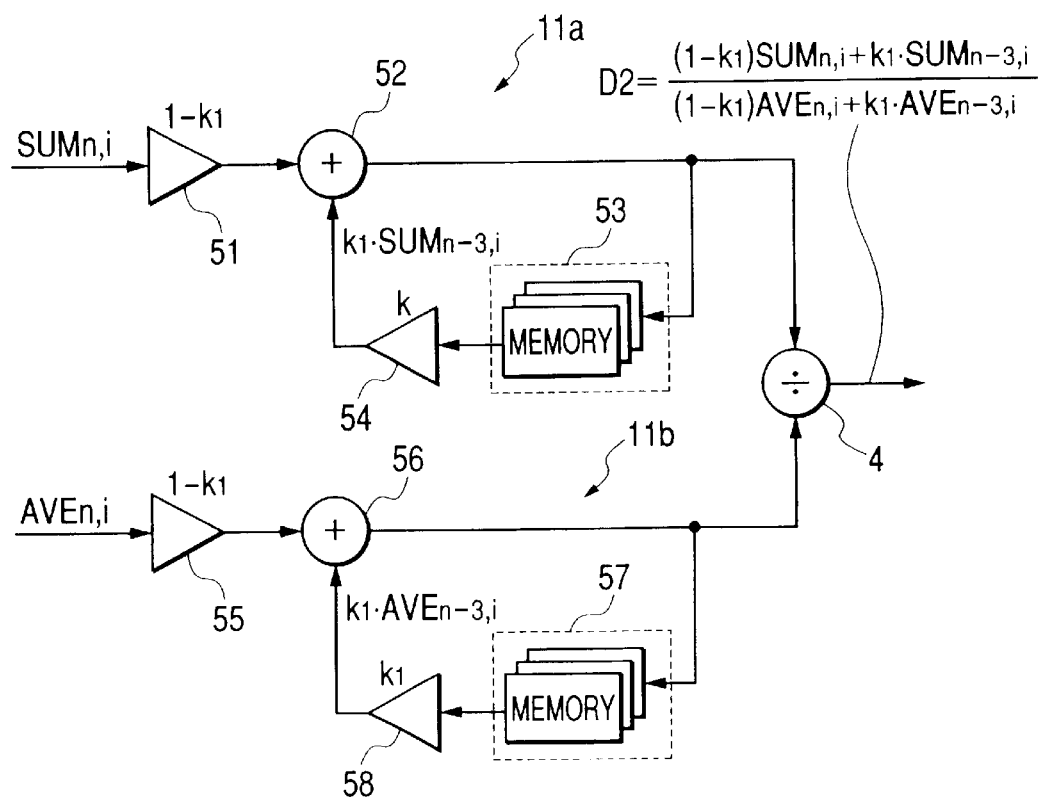
FIG. 11 is another example of the summing units according to the sixth embodiment.

FIG. 11 is another example of summing units 11a and 11b according to the sixth embodiment.

These summing units 11a and 11b employ circulation type filters.

The summing unit 11a includes a multiplier 51, an adder 52, a memory 53, and a multiplier 54. The multiplier 51 multiplies the output $SUM_{ni}$ of the integration circuit 1 by a coefficient $(1-k_1)$. The adder 52 adds an output of the multiplier 54 to the output of the multiplier 51. The memory 53 stores the output of the adder 52 and supplies an output which is three-frame-delayed from the output of the adder 52. The multiplier 54 multiplies an output of the memory 53 by the coefficient ki. The coefficient ki is a predetermined circular coefficient, wherein $0 \leq k_1 \leq 1$.

The summing unit 11b includes a multiplier 55, an adder 56, a memory 57, and a multiplier 58. The multiplier 55 multiplies the output $AVE_{n,i}$ of the integration circuit 1 by a coefficient $(1-k_1)$. The adder 56 adds an output of the multiplier 58 to the output of the multiplier 55. The memory 57 stores the output of the adder 56 and supplies an output which is three-frame-delayed from the output of the adder 56. The multiplier 58 multiplies an output of the memory 57 by the coefficient ki. The coefficient ki is a predetermined circular coefficient, wherein $0 \leq k_1 < 1$.

Thus, the output of the dividing circuit 4 is represented by:

$$D2 = \{(1-k_1) \times SUM_{n,i} + k \times SUM_{n-3,i}\} / \{(1-k_1) \times AVE_{n,i} + k_1 \times AVE_{n-3,i}\}$$

As mentioned above, the integrated signal of the present frame is added to the integrated signal of the three-frame-prior integrated signal and the averaged signal of the present frame is also added to the averaged signal of the three-frame-prior averaged signal to remove the affection due to the shot image of the object in the video signal. Thus, illumination flicker in the case of 50 Hz ac line and $\frac{1}{30}$ sec frame period can be favorably detected.

<SEVENTH EMBODIMENT>

An illumination flicker detection apparatus according to a seventh embodiment has substantially the same structure as that of the first embodiment. The difference is that the summing units 12a and 12b are further provided.

Figure 12:
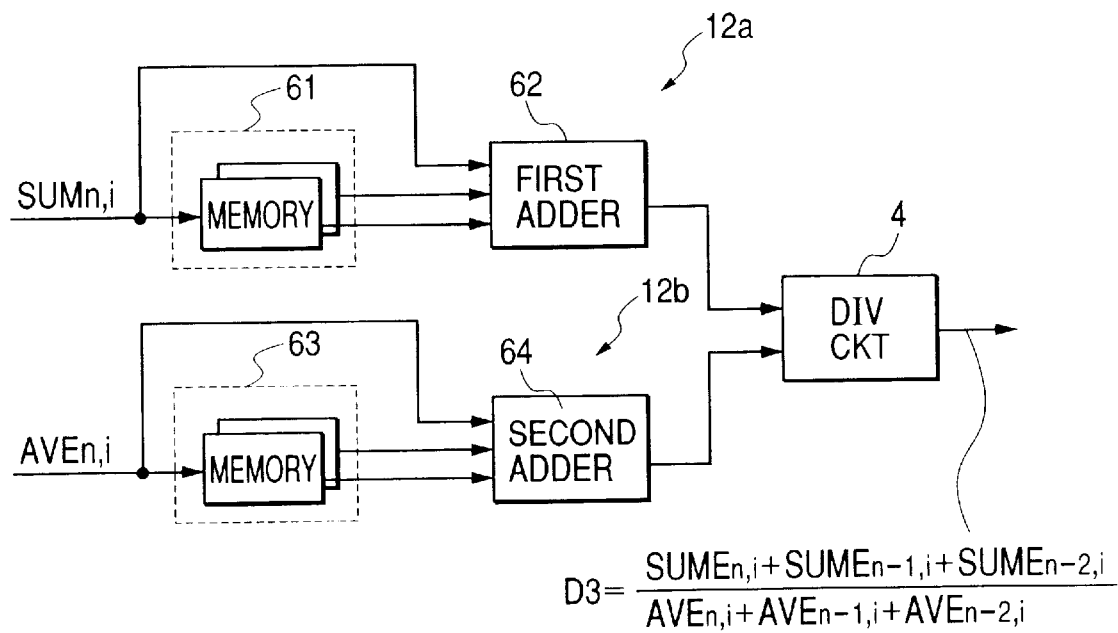
FIG. 12 is a block diagram of the summing units according to a seventh embodiment.

FIG. 12 is a block diagram of the summing units 12a and 12b according to the seventh embodiment.

The summing unit 12a includes a memory 61 storing the integrated signal $SUM_{n,i}$ and outputting a one-frame-delayed integrated signal and a two-frame-delayed integrated signal and an adder 62 for effecting addition among the two-frame delayed integrated signal $SUM_{n-2,i}$, the one-frame delayed integrated signal $SUM_{n-1,i}$ and the integrated signal $SUM_{n,i}$ and supplies the adding result to the dividing circuit 4.

The summing unit 12b includes a memory 63 storing the averaged signal $AVE_{n,i}$ and outputs a one-frame-delayed averaged signal $AVE_{n-1,i}$ a two-frame-delayed averaged signal $AVE_{n-2,i}$, and an adder 64 for affection addition among the two-frame delayed averaged signal $AVE_{n-2,\ i}$, the one-frame delayed averaged signal $AVE_{n-1,\ i}$, and the averaged signal $AVE_{n,\ i}$ and supplies the adding result to the dividing circuit 4. The dividing circuit 4 divides the adding result from the adder 62 by that from the adder 64. Thus, the output of the dividing circuit 4 is represented by:

$$D3 = (SUM_{n,i} + SUM_{n-1,i} + SUM_{n-2,i})/(AVE_{n,i} + AVE_{n-1,i} + AVE_{n-2,i})$$

In the case of 60 Hz of the ac line, if the frame period is $\frac{1}{30}$ sec, the level variation due to flicker does not appear every frame because the frame period is an integer times the illuminance variation period. However, if the frequency of the ac line varies around 60 Hz, black strips on a screen move every frame, so that the reproduced image is deteriorated. Thus, the integrated signal of the present frame, the one-frame-delayed integrated signal, and the two-frame-delayed integrated signal are summed and the averaged signal of the present frame, the one-frame-delayed averaged signal, and the two-frame-delayed averaged signal are summed to provide stable dividing result. This is because if the frequency of the ac line is 60 Hz and varies around 60 Hz and the frame period is $\frac{1}{30}$ sec, the video signal levels at the same line on the adjacent frames gradually vary. Thus, the video levels at the same lines on the adjacent frames are summed and the average at the same lines on the adjacent frames are summed. Then, division is effected, so that a stable dividing result is provided.

In this embodiment, adjacent three frames of the integrated signal and the average signal are summed, respectively. The number of frames in summing is determined in accordance with the relation between the frequency of the ac line and the frame frequency of the video signal. Thus, the number of frames is not limited to three. Accordingly, illumination flicker developed in the condition that the frequency of the ac line is 60 Hz and the frame period is $\frac{1}{30}$ sec can be favorably detected.

<EIGHTH EMBODIMENT>

An illumination flicker detection apparatus according to an eighth embodiment has substantially the same structure as that of the first embodiment. The difference is that the averaging block 13 is further provided.

Figure 13:
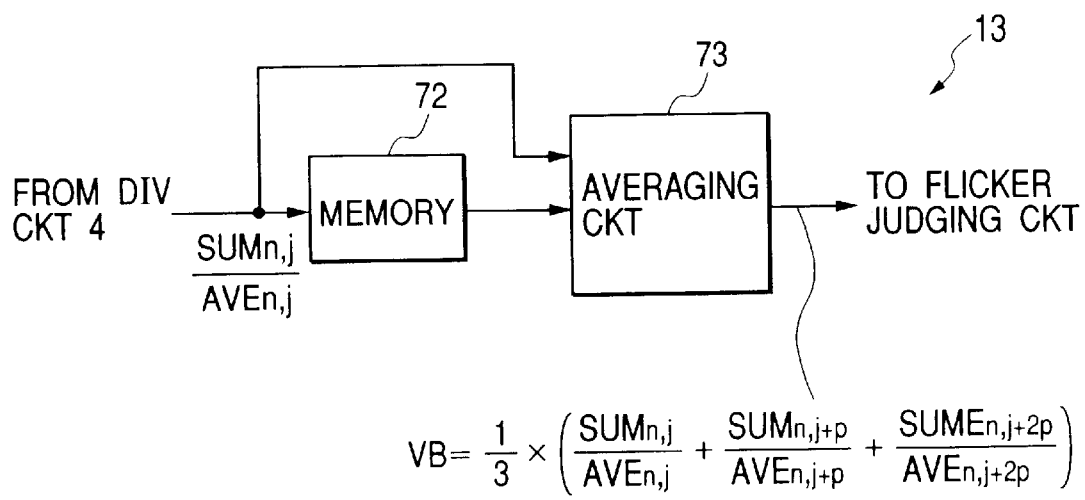
FIG. 13 is a block diagram of the averaging block according to an eighth embodiment.

FIG. 13 is a block diagram of the averaging block according to the eighth embodiment.

The averaging block includes a memory 72 and an averaging circuit 73. The memory 72 stores the dividing result from the dividing circuit 4 and when the inputted dividing result is $j^{th}$ line, the memory 72 outputs the delayed dividing results at the $(j+p)^{th}$ and $(j+2p)^{th}$ horizontal lines on the same field. The averaging circuit 73 averages the dividing results of $j^{th}$, $(j+p)^{th}$, and $(j+2p)^{th}$ horizontal lines. Thus, the output signal of the averaging block is given by:

$$VB = \{(SUM_{n,j}/AVE_{n,j}) + (SUM_{n,j+p}/AVE_{n,j+p}) + (SUM_{n,j+2p}/AVE_{n,j+2p})\} \times 1/3$$

The averaging circuit 73 may be replaced with a median filter to filter the dividing results on the different horizontal lines at the same frame showing the same phase in the beat frequency of the flicker component. The averaged signal is supplied to the flicker judging circuit 5.

As mentioned above, the dividing results at the horizontal line showing the same phase of the flicker component at the same frame are averaged, so that affection in luminance variation level due to the shot image of the object in the video signal is removed.

<NINTH EMBODIMENT>

An illumination flicker detection apparatus according to a ninth embodiment has substantially the same structure as that of the first embodiment. The difference is that a threshold value processing circuit 82 is further provided to the flicker judging circuit 5b. The threshold value processing circuit 82 changes threshold values in accordance with a shutter speed signal which is also used for controlling the shutter speed of the imager generating the video signal supplied to the integration circuit 1.

Figure 14:
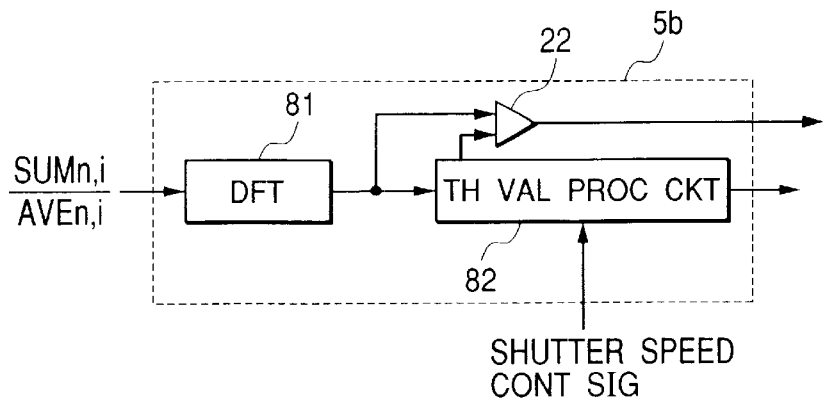
FIG. 14 is a block diagram of the flicker judging circuit according to a ninth embodiment.

FIG. 14 is a block diagram of the flicker judging circuit 5b according to the ninth embodiment.

The threshold value processing circuit 82 changes threshold values $TH_{50-ON}$, $TH_{60-ON}$, $TH_{50-OFF}$, and $TH_{60-OFF}$ in accordance with the shutter speed signal to supply the changed values to the comparing circuit 22.

Figure 15A:
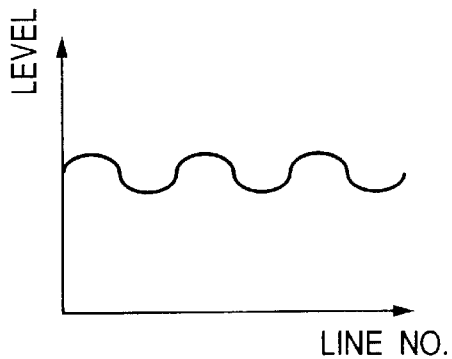
FIGS. 15A and 15C are graphical drawings showing the outputs of the dividing circuit when the shutter speed is high and low, respectively.
Figure 15B:
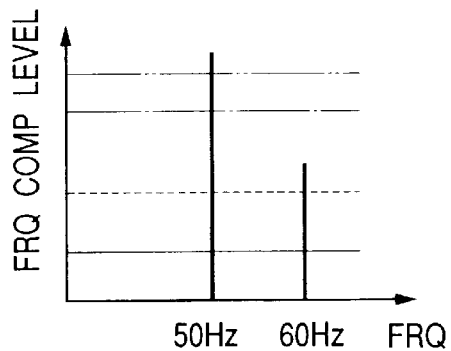
FIGS. 15B and 15D are graphical drawings showing flicker components detected by the DFT circuit when the shutter speed is high and low, respectively.
Figure 15C:
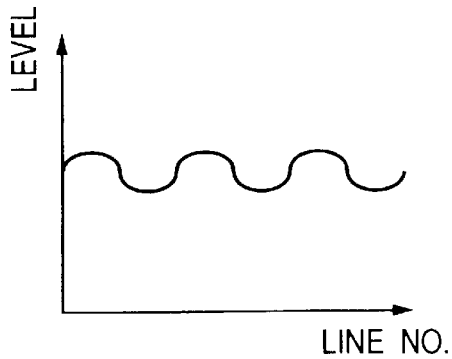
Figure 15D:
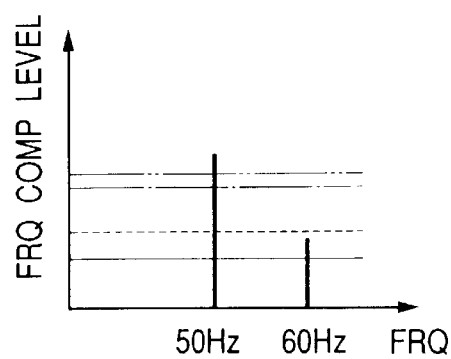

FIGS. 15A and 15C are graphical drawings showing the outputs of the dividing circuit 4 when the shutter speed is high and low, respectively. FIGS. 15B and 15D are graphical drawings showing flicker components detected by the DFT circuit 81 when the shutter speed is high and low, respectively.

As clearly understood by comparing FIG. 15B with FIG. 15D, the flicker components are relatively high when the shutter speed is high but the flicker components are relatively low when the shutter speed is low. Then, in this embodiment, the threshold values are set to be high when the shutter speed is high. On the other hand, when the shutter speed is low, the threshold values are set to be low in accordance with the shutter speed signal.

Accordingly, the flicker components are judged more accurately by controlling the threshold values which are compared with the outputs of the DFT circuit 81. Thus, though the shutter speed is changed, accurate illumination flicker judgment is provided.

<TENTH EMBODIMENT>

An illumination flicker compensation signal generation apparatus according to a ten embodiment has substantially the same structure as that of the first to ninth embodiments. The difference is that a flicker compensation signal generation circuit 92 is further provided in addition to the illumination flicker detection apparatus according to the first to ninth embodiments.

Figure 16:
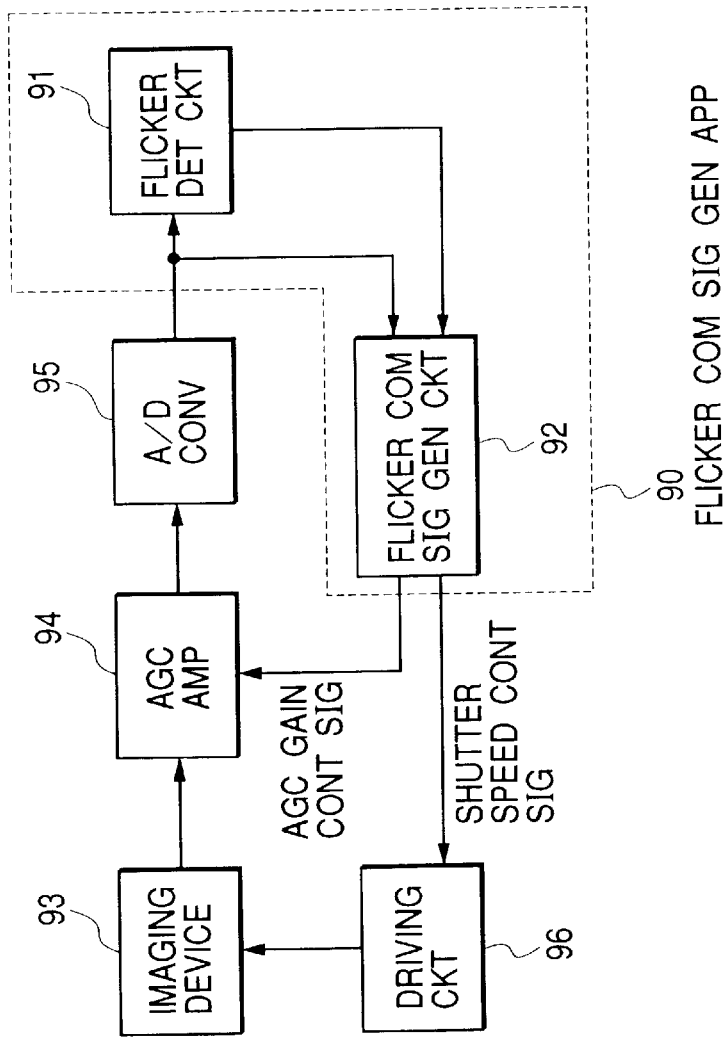
FIG. 16 is a block diagram of the imaging apparatus according to a ten embodiment.

FIG. 16 is a block diagram of an imaging apparatus according to the ten embodiment. In FIG. 16, the flicker compensation signal generation apparatus 90 is structured as a portion of the imaging apparatus.

The imaging apparatus includes an imaging device 93 such as MOS type imaging element, an AGC (automatic gain control) amplifier 94, an a/d converter 95, the flicker compensation signal generation apparatus 90, and a driving circuit 96. The flicker compensation signal generation apparatus 90 includes the flicker detection circuit 91 and the flicker compensation signal generation circuit 92.

The imaging device 93 takes an image and generates the video signal. Particularly, the imaging device 93 takes an image of an object under illumination of which luminance varies with the periodical voltage variation of the ac line. The imaging device is driven by the driving circuit 96. The AGC amplifier 94 amplifies the video signal from the imaging device 93 with its gain controlled in accordance with an AGC gain control signal. The a/d converter 95 converts the video signal from the AGC amplifier 94 into a digital video signal. A flicker detection circuit 91 detects illumination flicker from the digital video signal as mentioned in the first to ninth embodiments. The flicker compensation signal generation circuit 92 performs illumination flicker compensation with the digital video signal from the a/d converter 95 and the detection result of the flicker detection circuit 91 by generating a shutter speed control signal supplied to the driving circuit 96 and the AGC gain control signal supplied to the AGC amplifier 94.

Figure 17:
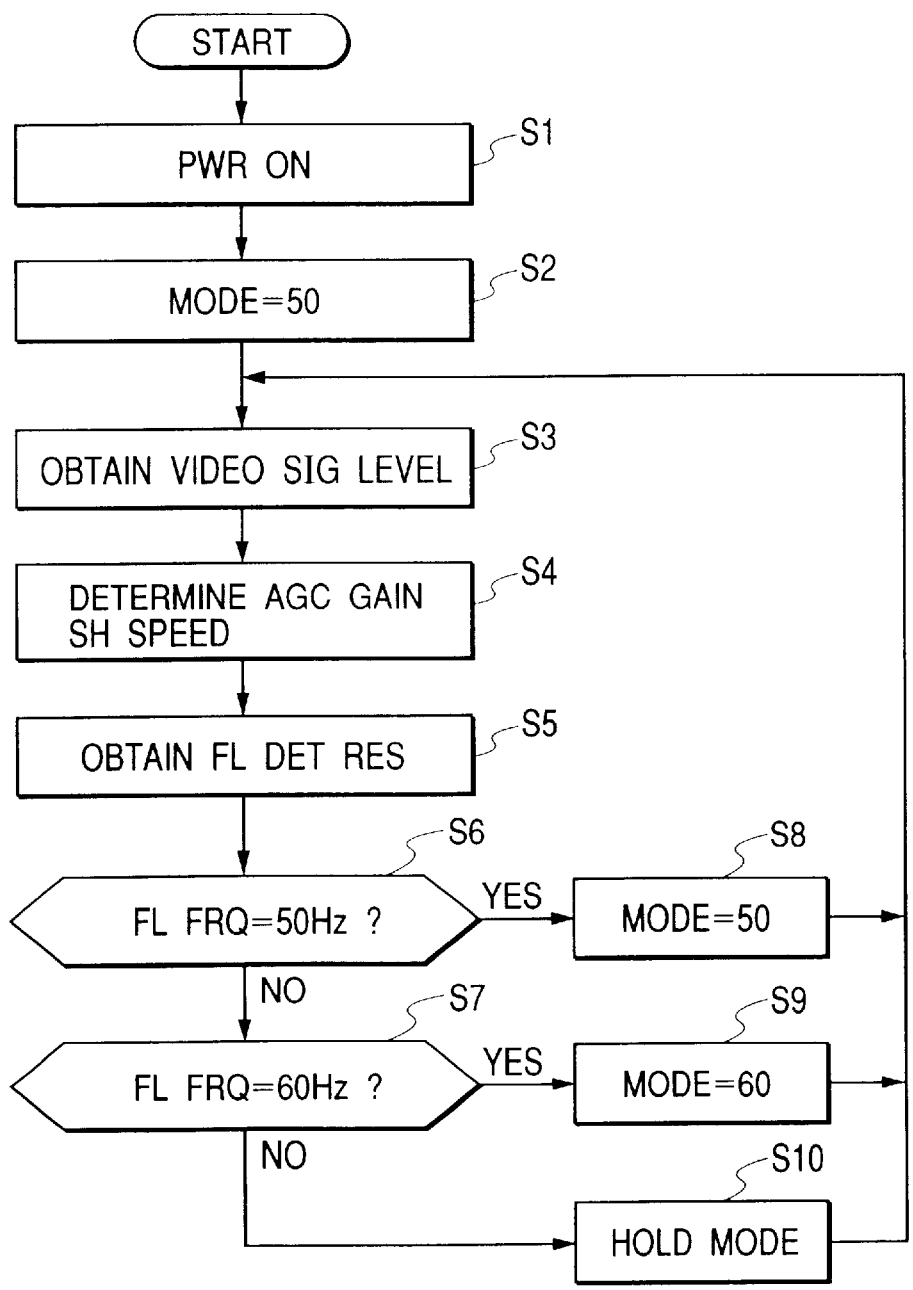
FIG. 17 depicts a flow chart showing operation of the flicker compensation signal generation circuit according to the tenth embodiment.

FIG. 17 depicts a flow chart showing the operation of the Ad flicker compensation signal generation circuit 92.

In step s1, when the flicker compensation signal generation circuit 92 detects power-on, the flicker compensation signal generation circuit 92 sets the mode of illumination flicker compensation to 50 Hz in step s2. Next, the flicker compensation signal generation circuit 92 repeatedly executes the operation in the loops including the steps s3 to s10.

In step s3, the flicker compensation signal generation circuit 92 obtains the video level of the digital video signal. In the following step s4, the flicker compensation signal generation circuit 92 determines the AGC gain and the shutter speed and generates the AGC gain control signal and the shutter speed control signal. In step s5, the flicker compensation signal generation circuit 92 obtains the illumination flicker detection result. In the following step s6, the flicker compensation signal generation circuit 92 judges whether the illumination flicker frequency is 50 Hz. If the illumination flicker frequency is 50 Hz, the flicker compensation signal generation circuit 92 sets the mode of illumination flicker compensation to 50 Hz in step s8.

If the illumination flicker frequency is not 50 Hz in step s6, the flicker compensation signal generation circuit 92 judges whether the illumination flicker frequency is 60 Hz in step s7. If the illumination flicker frequency is 60 Hz in step s7, the flicker compensation signal generation circuit 92 sets the mode of the illumination flicker to 60 Hz in step s9. If the illumination flicker frequency is not 60 Hz in step s7, the flicker compensation signal generation circuit 92 holds the mode as it is. After steps s8, s9, and s10, processing returns to step s3.

Figure 18A:
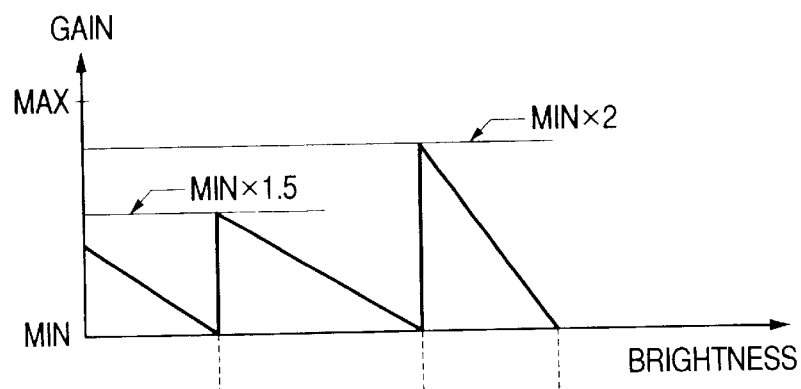
FIGS. 18A and 18B are graphical drawings showing the gain controlling and the shutter controlling referred in ten and fifteenth embodiments.
Figure 18B:
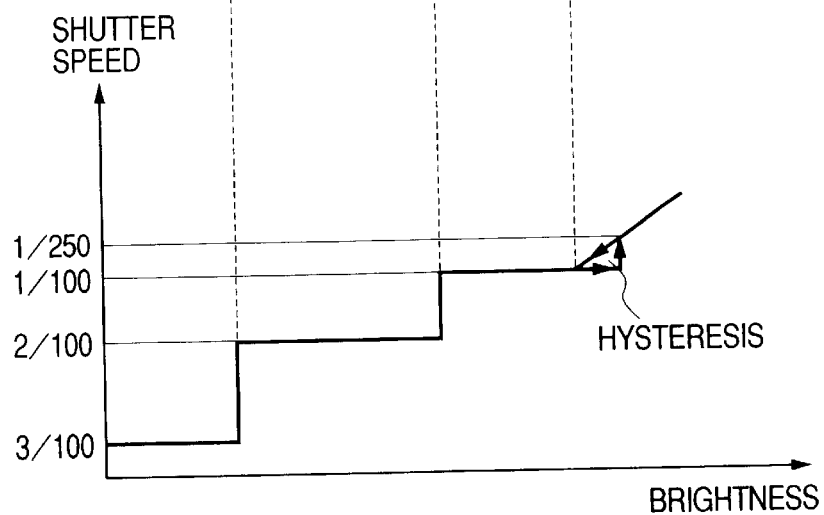

FIGS. 18A and 18B are graphical drawings showing the gain controlling and the shutter controlling referred in ten and fifteenth embodiments.

The flicker compensation signal generation circuit 92 controls the shutter speed and the AGC gain as shown in FIGS. 18A and 18B in the 50 Hz mode.

The flicker compensation signal generation circuit 92 obtains brightness in the video image of the digital video signal and determines the AGC gain and the shutter speed in accordance with the detected brightness and the flicker judgment result. In FIG. 18A, "MIN" indicates the minimum value of the AGC gain and the "MAX" indicates the maximum value of the AGC gain.

When brightness is low, the shutter speed is determined in accordance with the frame frequency (e.g., 30 Hz) and the frequency of the ac line voltage (e.g., 50 Hz). Thus, in the low brightness condition, the shutter speed (interval) is 3/100 sec which is the lowest one of values which are integer times a half cycle of the ac line voltage.

With increase in the brightness, the AGC gain is gradually reduced. When the AGC gain reaches the minimum of the AGC gain as shown in FIG. 18A, the flicker compensation signal generation circuit 92 instantaneously changes the shutter speed (interval) to $2/100$ sec as shown in FIG. 18B. At the same time, the flicker compensation signal generation circuit 92 changes the shutter speed to $3/2$ times the minimum value, wherein "$3/2$" is an inverse number of the changing rate of the shutter speed. This prevents the rapidly changing in the brightness in the reproduced video image around shutter speed changing instance.

With further increase in the brightness, the AGC gain is gradually reduced again. When the AGC gain reaches the minimum of the AGC gain again, the flicker compensation signal generation circuit 92 instantaneously changes the shutter speed (interval) to $1/100$ sec. At the same time, the flicker compensation signal generation circuit 92 changes the shutter speed to twice the minimum value which is an inverse number of the changing rate of the shutter speed.

When the shutter speed reaches the maximum shutter speed without flicker, that is, $1/100$ sec in 50 Hz, and the AGC gain is minimum, the shutter speed is increased (shutter interval is reduced) from $1/100$ sec. On the other hand, the AGC gain is held. Thus, the brightness in the video signal is not saturated, so that the dynamic range can be increased.

Moreover, favorably, hysteresis is provided between the shutter speed of $1/100$ sec and higher shutter speeds (e.g., $1/250$ sec).

The operation mentioned above is for the 50 Hz of the ac line. In the case of 60 Hz, the shutter speed is set to values which are integer times the half cycle of the ac line voltage, that is, $2/120$ sec, $2/120$ sec, $3/120$ sec . . .

In the circuit example shown in FIG. 16, the AGC amplifier 94 is provided and the gain controlling is effected in the analog manner. However, it is also possible that a digital AGC control circuit is provided after the a/d converter 95 instead the AGC amplifier 94 and the digital AGC control circuit is controlled in accordance with the AGC gain control signal (data).

In the above-mentioned embodiments, the averaging unit 6 effects averaging with the integrated values of the present frame and the previous frames. However, it is also possible to average only integrated values of previous frames. Moreover, in the above-mentioned embodiments, illumination flicker is detected with MOS type of imager. However, this invention is applicable to the video signal generated from CCD imaging devices.

As mentioned above, according to the illumination flicker detection apparatus and the method of detecting flicker, it is possible to detect illumination flicker developed during shooting images under illumination by ac line voltage without affection due to luminance level change of an object in the images because the video signal levels in a plurality of frames are averaged and the flicker existent judgment is effected in accordance with the averaged value. Moreover, the illumination flicker detection in the case of 60 Hz of ac lines at the frame frequency of 30 Hz can be provided.

Moreover, the shutter speed and the AGC gain are controlled in accordance with the video signal level of the inputted video signal and the detected flicker frequency to compensate brightness change due to illumination flicker. Moreover, only the shutter speed is further controlled when the brightness is sufficiently high. This prevents a trouble in the reproduced image when the brightness is high.

<ELEVENTH EMBODIMENT>

Figure 21:
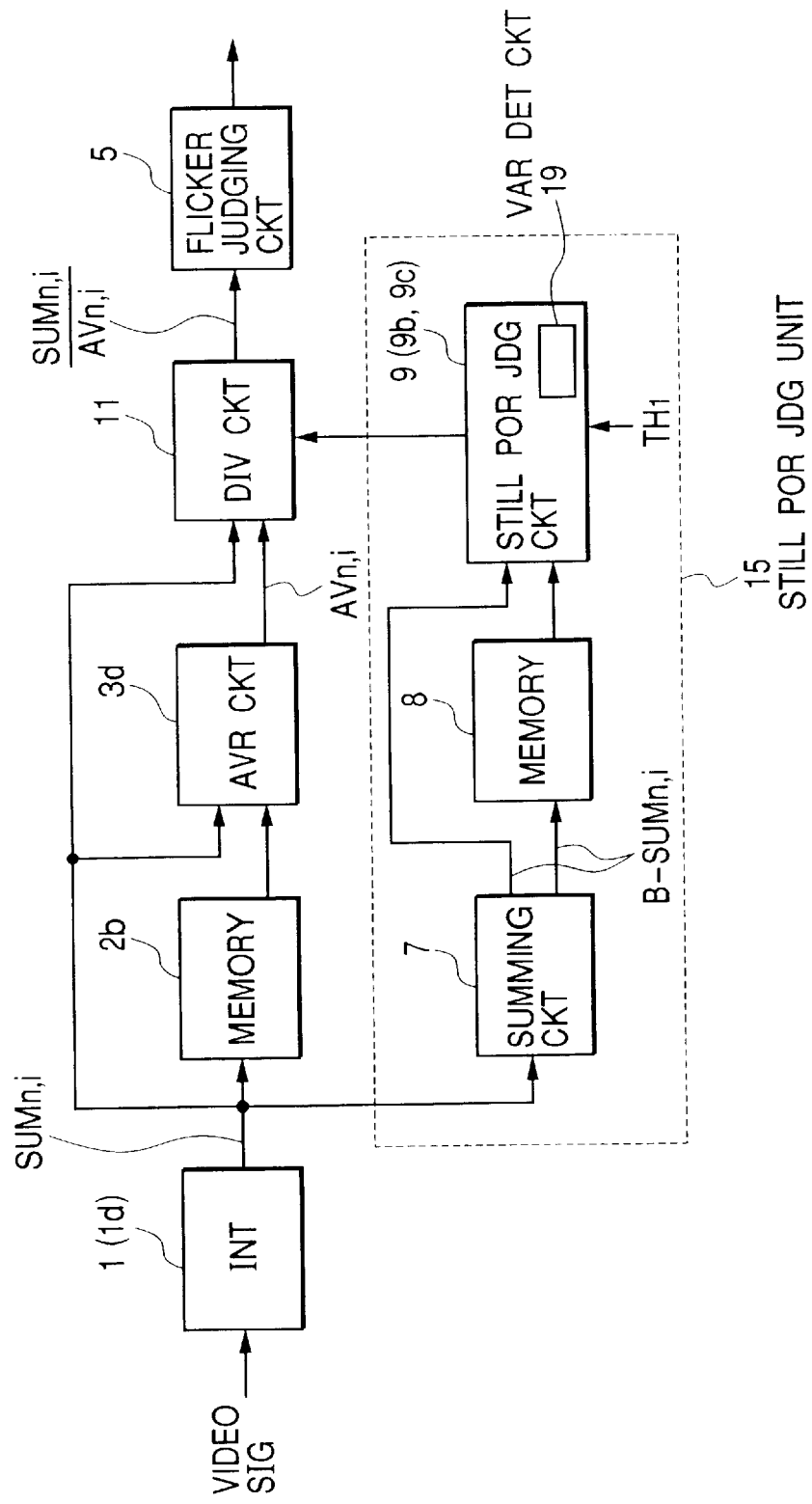
FIG. 21 is a block diagram of the illumination flicker detection apparatus according to an eleven embodiment.

FIG. 21 is a block diagram of an illumination flicker detection apparatus according to the eleven embodiment.

The illumination flicker detection apparatus includes the integrating circuit 1, the averaging unit 6 including the memory 2b and the averaging circuit 3, the dividing circuit 11, the flicker judging circuit 5, and a still portion judging unit 15.

A video signal is inputted to the integrating circuit 1. The integrating circuit 1 integrates pixel levels in every horizontal line (unit area) in a frame from the video signal. The memory 2b stores the integration result over a plurality of frames (fields). The averaging circuit 3 averages the integration results of horizontal lines at a plurality of frames (fields) from the integration result from the integrating circuit 1 and the memory 2b. The dividing circuit 11 divides the integration results of horizontal lines by the averaged result of horizontal lines, respectively, when the still portion judging unit 15 detects a still portion. The flicker judging circuit 5 judges whether flicker exists in the video signal by frequency-analyzing the dividing results of horizontal lines.

This illumination flicker detection apparatus is provided with a discrete circuit in this embodiment. However, the illumination flicker detection apparatus is also provided with a Digital Signal Processor (DSP), or a computer with a program.

The video signal is generated by a video camera (not shown in FIG. 21) under illumination of which luminance varies in accordance with the voltage change of the ac line. That is, an image of an object illuminated by fluorescent lamps is shot by the video camera.

The integration circuit 1 integrates, accumulates, or averages the pixel levels (luminance level) at every horizontal line. The integrating result of $i^{th}$ line of $n^{th}$ frame is represented by $SUM_{n,i}$ as shown in FIG. 2A. If one frame of the video signal includes 480 lines, the integration circuit 1 calculates the integration result $SUM_{n,1}$ to $SUM_{n,480}$ for i=1 to 480.

Figure 22:
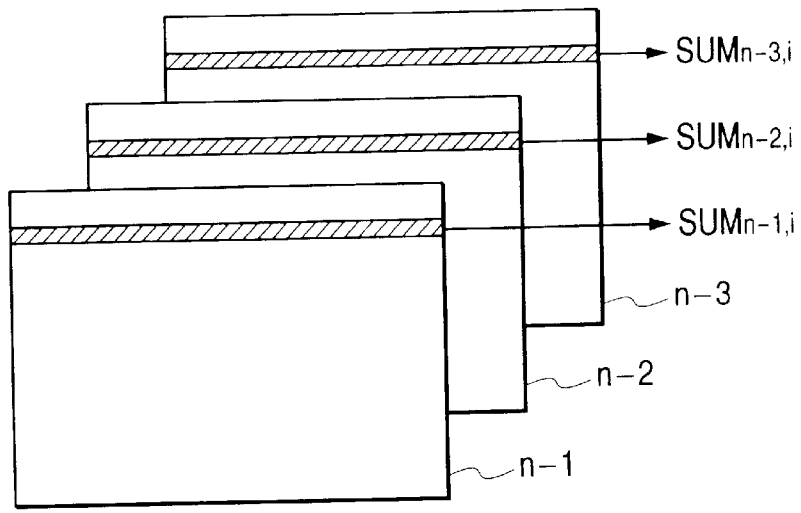
FIG. 22 shows summing or averaging operation according to the eleven embodiment.

The memory 2b successively stores a predetermined number of frames (fields) of the integration result. The averaging circuit 3 effects addition or averaging among $SUM_{n-1,i}$, $SUM_{n-2,i}$, and $SUM_{n-3,i}$ from the memory 2b. FIG. 22 shows the summing or averaging operation from the integration results of the previous frames. The memory 2b stores the integration result $SUM_{n,i}$ and outputs the integration results $SUM_{n-1, i}$, $SUM_{n-2,i}$, $SUM_{n-3,i}$ at the $i^{th}$ line at frames n−1 to n−3. The averaging circuit 3d averages (sums) $SUM_{n-1,i}$, $SUM_{n-2,i}$, and $SUM_{n-3,i}$. The averaging result is represented as $AV_{n,i}$. In this embodiment, the number of the previous frames per one unit averaging operation is three. However, it is also possible that, at least, the integration results of more than one previous frames are added to the integration result of the present frame.

Figure 23:
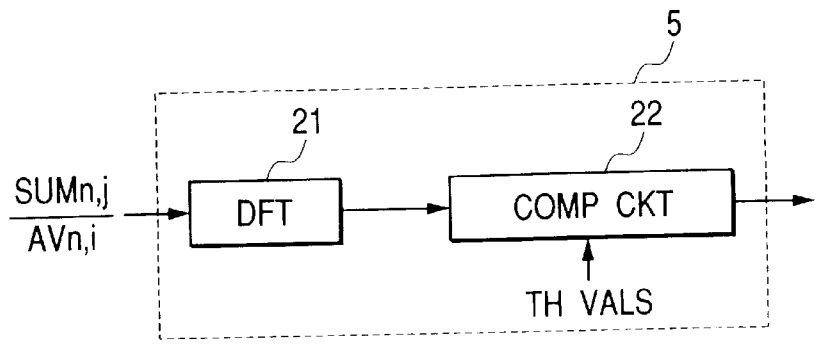
FIG. 23 is a block diagram of the flicker judging circuit according to the eleven embodiment.

The dividing circuit 11 obtains $SUM_{n,i}/AV_{n,i}$ through calculation from the output $SUM_{n,i}$ of the integration circuit 1 and the output $AV_{n,i}$ of the averaging circuit 3d when the still portion judging unit judges that the block is still. The flicker judging circuit 5 judges whether there is flickering with the dividing result of the dividing circuit 11. FIG. 23 is a block diagram of the flicker judging circuit 5 according to the eleven embodiment. The flicker judging circuit 5 includes the DFT (Discrete Fourier Transform) circuit 21, supplied with the integration result $SUM_{n,i}$ and the averaging result $AV_{n,i, for\ detecting\ frequency}$ component levels and the comparing circuit 22 for comparing the output of the DFT circuit 21 with threshold values.

The still portion judging unit 15 includes a summing circuit 7, a memory 8, and a still portion judging circuit 9. The still portions judging unit 15 detects a still portion at the image on the screen using the output of the integrations circuit 1.

The summing circuit 7 sums the integration results of lines included in N cycles of the flicker component at a frame. A portion of a frame including N cycles of flicker component is referred to as a still portion judging block. It is assumed that the top line number at $j^{th}$ still portion judging block at $n^{th}$ frame is k and the number of lines in N (natural number) cycles of the flicker component at the frame is p (natural number). Then, the output $B\text{-}SUM_{nj}$ of the summing circuit 7 is given by:

$$B\text{-}SUM_{nj}=SUM_{nk}+SUM_{nk+1}+ \ldots +SUM_{nk+p-1}$$

Figure 24:
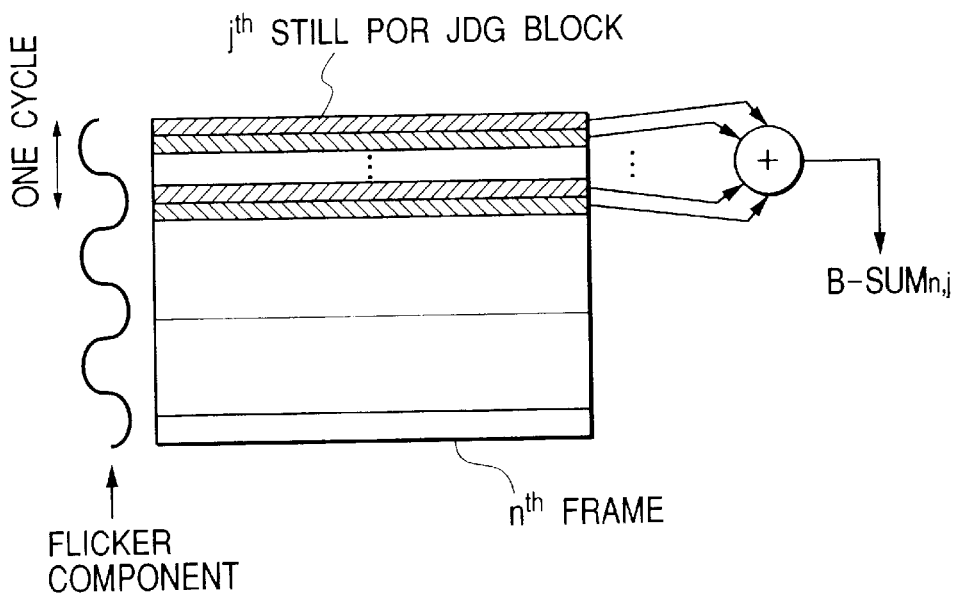
FIG. 24 is an illustration showing summing operation according to the eleven embodiment.

FIG. 24 is an illustration showing the summing operation according to the eleven embodiment, wherein N=1 and j=1. As shown in FIGS. 19A to 19D, if the cycle of the ac line used for illumination is 50 Hz and the frame cycle is 30 Hz, N lies from one to three.

The summing results of the summing circuit 7 obtained as mentioned above are the same with respect to periodical variation in the luminance of the light source.

Figure 25:
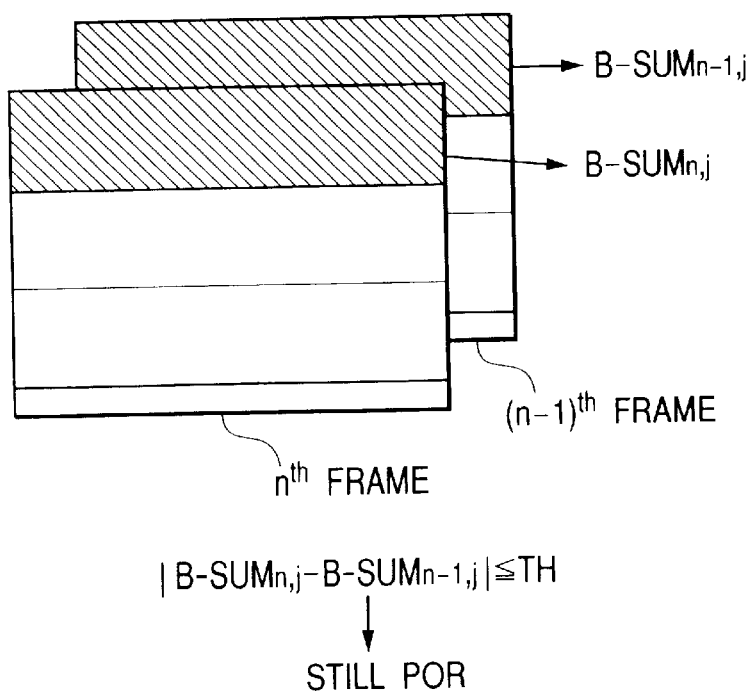
FIG. 25 is an illustration showing operation of the still portion judging circuit according to the eleven embodiment.

FIG. 25 is an illustration showing the operation of the still portion judging circuit 9. The memory 8 temporally stores the summing results of several frames. The still portion judging circuit 9 calculates difference between the summing result $B\text{-}SUM_{nj}$ of the present frame from the summing circuit 7 and the one-frame-prior summing result $B\text{-}SUM_{n-1,j}$ from the memory 8 and compares the difference with a threshold value $TH_1$. When the difference is lower than the threshold value $TH_1$, the still portion judging circuit 9 judges the block is still portion.

As mentioned above, because the flickers component levels at the summing results $B\text{-}SUM_{n,j}$ and $B\text{-}SUM_{n-1,j}$ are the same, the difference represents variation or movement of the image of an object at the still portion judging block. Therefore, the still portion judging block is judged to be still when the difference is lower than the threshold value $TH_1$.

The dividing circuit 11 calculates division $SUM_{ni}/AV_{ni}$ from the output $SUM_{ni}$ of the integration circuit 1 and the output $AV_{ni}$ of the averaging circuit 3d when the difference is lower than the threshold value $TH_1$. When the difference is equal to or higher than the threshold value $TH_1$, the dividing circuit 11 does not output the dividing result.

FIG. 4A shows the output of the dividing circuit 11 according to the eleven embodiment, wherein the axis of abscissas represents line number at a frame and the axis of ordinates represents levels of dividing results, that is, $SUM_{n,i}/AV_{n,i}$. The dividing results shows flickering.

FIG. 4B shows the output of the DFT circuit 21 according to the first embodiment, wherein the axis of abscissas represents frequency and axis of ordinates represents levels of frequency components.

The line $F_{50}$ represents the level of the DFT circuit 21 at 50 Hz, i.e., component of 50 Hz and the line $F_{60}$ represents the level of the DFT circuit 21 at 60 Hz, i.e., component of 60 Hz.

The comparing circuit 22 compares the results $F_{50}$ and $F_{60}$ of the DFT circuit 21 with threshold levels $TH_{50\text{-}ON}$, $TH_{60\text{-}ON}$, $TH_{50\text{-}OFF}$, and $TH_{60\text{-}OFF}$. There are relations, $TH_{50\text{-}ON} > TH_{50\text{-}OFF}$ and $TH_{60\text{-}ON} > TH_{60\text{-}OFF}$.

Basically, the comparing circuit 22 compares the component $F_{50}$ with the threshold levels $TH_{50\text{-}ON}$ and $TH_{50\text{-}OFF}$ and the component $F_{60}$ with the threshold levels $TH_{60\text{-}ON}$ and $TH_{60\text{-}OFF}$ to detect flicker in the video signal.

More specifically, the comparing circuit 22 judges the flicker as follows:

When (the value of) $F_{50} < TH_{50\text{-}OFF}$ and (the value of) $F_{60} < TH_{60\text{-}OFF}$, the comparing circuit 22 judges that there is no flicker.

When $\alpha \times F_{60} < F_{50}$ and $F_{50} > TH_{50\text{-}ON}$, the comparing circuit 22 judges there is flicker of 50 Hz.

When $\beta \times F_{50} < F_{60}$ and $F_{60} > TH_{60\text{-}ON}$, the comparing circuit 22 judges there is flicker of 60 Hz.

In other cases, the comparing circuit 22 judges that it is unknown that there is flicker.

In the above equations, $\alpha$ is a weighting coefficient for flicker detection of 50 Hz and $\beta$ is a weighting coefficient for flicker detection of 60 Hz. These coefficients are sufficiently greater than one, so that if the frequency component $F_{50}$ ($F_{60}$) is greater than the value of the weighting-coefficient-times the frequency component $F_{60}$ ($F_{50}$), the comparing circuit 22 judges there is flicker of 50 Hz (60 Hz). This reduces probability of erroneous judgment of existence of flicker due to luminance level change within a frame representing an image.

As mentioned above, according to this embodiment, the existence of flicker is judged from the average of integration values over a plurality of frames (fields) including the present frame at the corresponding lines. Thus, the flicker detection can be provided without affection of luminance level variation due to motion of the image. Moreover, this structure (this method) provides illumination flicker detection of 60 Hz wherein luminance level variation.

In the eleven embodiment, the integration circuit 1 integrates the pixel values every horizontal line. However, it is also possible that the integration circuit 1 integrates the pixel value on thinned horizontal lines, wherein thinning period is sufficiently shorter than the period of flicker (beat) component. In this case, the circuit stage after the integration circuit 1 effects the above-mentioned operation for the thinned horizontal lines. Thus, the capacity of the memory 2b can be reduced.

In this embodiment, the still portion judging unit 15 supplies the result of still portions to the dividing circuit 11. However, it is also possible to use the result in the flicker judging circuit 5.

<TWELFTH EMBODIMENT>

An illumination flicker detection apparatus according to a twelfth embodiment has substantially the same structure as that of the eleven embodiment. The difference is that the integrating circuit 1d effects integration every a plurality of horizontal lines in which the flicker component level is considered to be substantially the same. That is, the video (luminance) levels of pixels are integrated every adjacent or consecutive lines.

Figure 26:
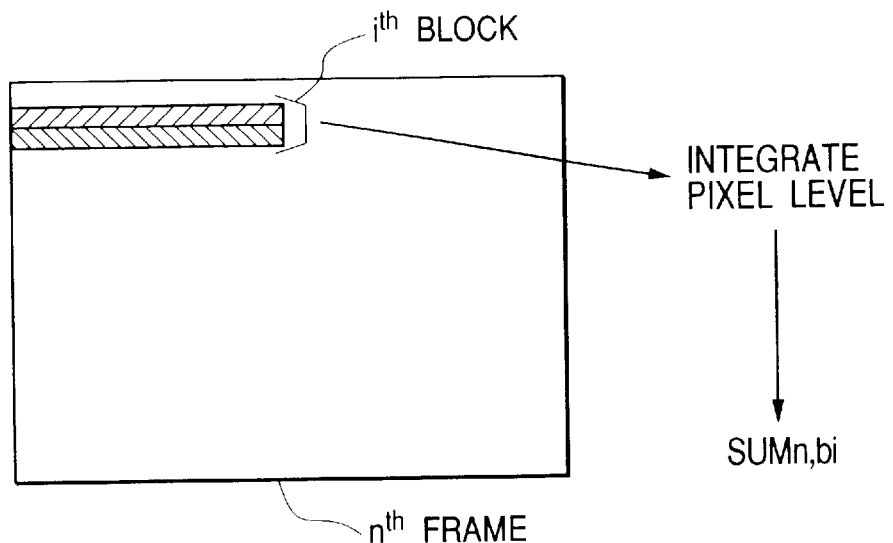
FIG. 26 is an illustration showing operation of the integration circuit according to a twelfth embodiment.

FIG. 26 is an illustration showing the operation of the integration circuit 1d according to the twelfth embodiment.

As shown in FIG. 26, the integration circuit 1d integrates or averages the video (luminance) level of pixels every block (in the drawing, left portions of the two consecutive horizontal lines) in which the flicker component level is considered to be substantially the same. Here, the area at which the flicker component level is considered to be substantially the same is referred to as a block. The integrated or averaged value of the video level of all effective pixels at the $i^{th}$ block at $n^{th}$ frame is represented by $SUM_{n,bi}$.

Figure 27:
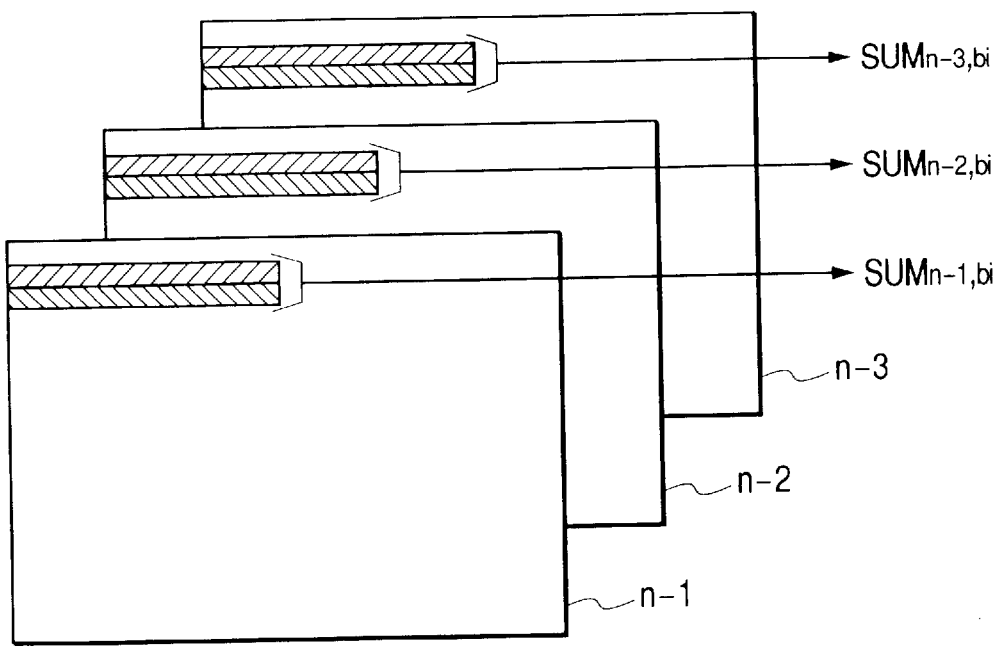
FIG. 27 is an illustration showing summing or averaging operation according to the twelfth embodiment.

FIG. 27 is an illustration showing the summing or averaging operation from the integration results of the present frame and the previous frames. The memory 2b stores the integration result $SUM_{n,bi}$ and outputs the integration results $SUM_{n-1,bi}$, $SUM_{n-2,bi}$, $SUM_{n-3,bi}$ at the $i^{th}$ block at frames n-1 to n-3. The averaging circuit 3d, shown in FIG. 21, averages (sums) $SUM_{n-1,i}$, $SUM_{n-2,i}$, and $SUM_{n-3,i}$. The averaging result is represented as $AV_{n,i}$. In this embodiment, the number of the previous frames per one unit averaging operation is three. However, it is also possible that, at least, the integration results of more than one previous frames are summed.

Figure 28:
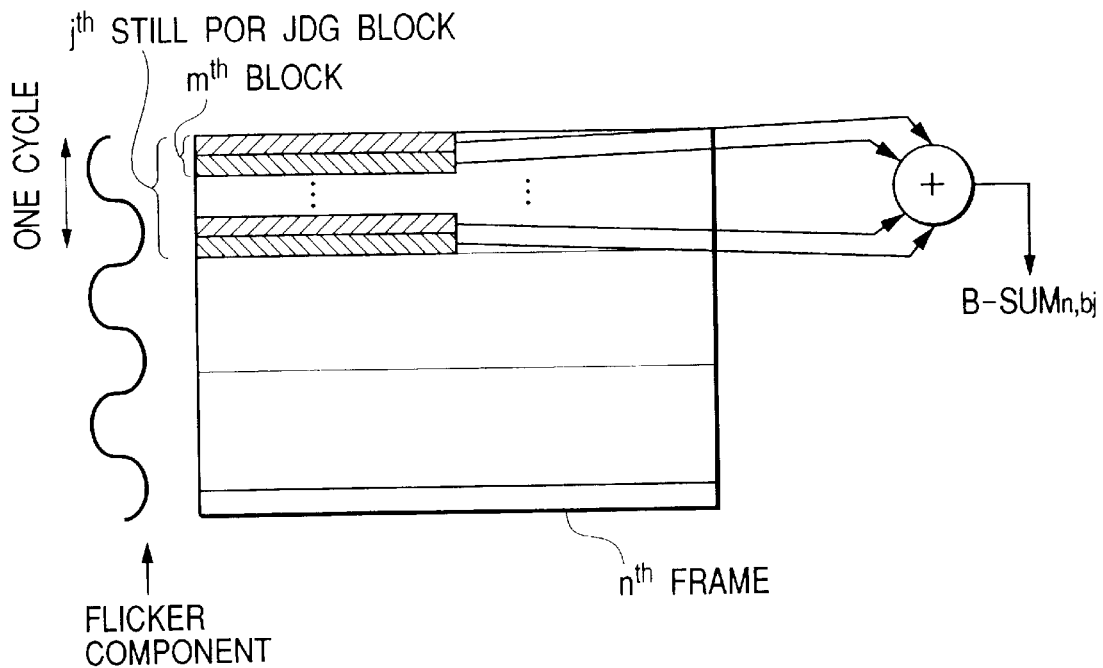
FIG. 28 is an illustration showing summing operation according to the twelfth embodiment.

FIG. 28 is an illustration showing the summing operation according to the twelfth embodiment. The summing circuit 7 sums the integration results of horizontal lines at the still portion judging block corresponding to N cycles of the flicker component at a frame. The summing circuit 7 sums the integration results of q blocks at $j^{th}$ still portion judging block. It is assumed that the number of the top block is m. The output B-SUM$_{nbj}$ is given by:

$$B\text{-}SUM_{nbj} = SUM_{nm} + SUM_{nm+1} + \ldots + SUM_{nm+q-1}$$

As described in the eleven embodiment, N is a natural number from 1 to 3 when the ac line frequency is 50 Hz and the frame frequency is 30 Hz. FIG. 28 shows the condition that N=1 and j=1. The summing result of the blocks (horizontal lines) corresponding to N cycle of the flicker component shows the same luminance level with respect to the flickering.

Figure 29:
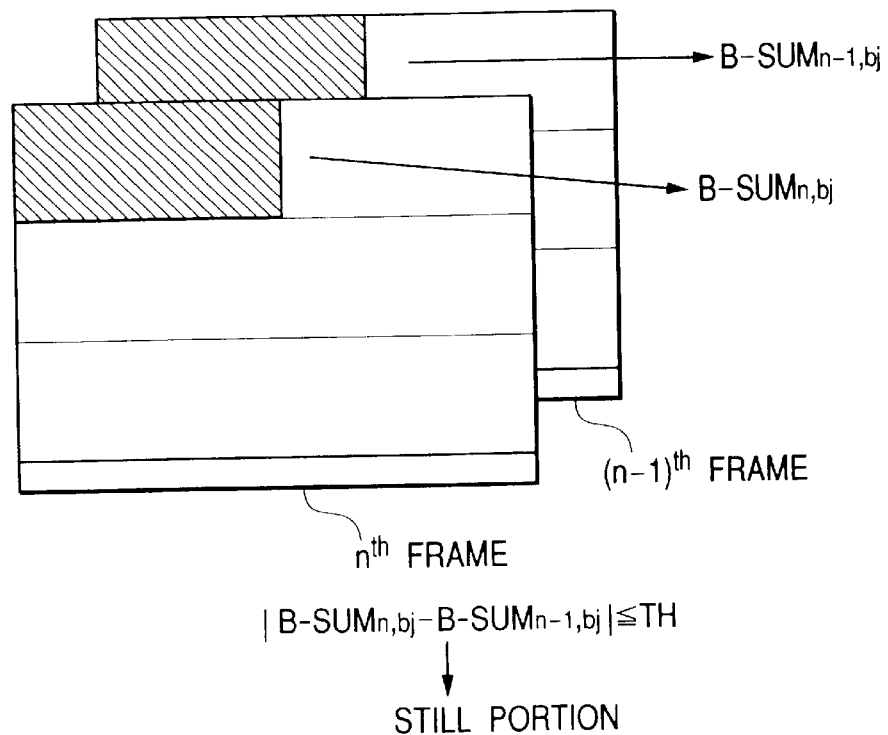
FIG. 29 is an illustration showing the still portion judging operations according to the twelfth embodiment.

FIG. 29 is an illustration showing the still portion judging operations according to the twelfth embodiment. The still portion judging circuit 9 calculates difference between the summing result B-SUM$_{nbj}$ and the one-frame-prior summing result B-SUM$_{n-1}$ read from the memory 8 and compares the difference with the threshold value TH$_1$. When the difference is lower than the threshold value TH$_1$ the still portion judging circuit 9 judges the still portion judging block is in the still condition.

The still portion judging circuit 9 supplies the judging result to the dividing circuit 11. The dividing circuit 11 calculates SUM$_{nbi}$/AV$_{nbi}$ only when the still portion judging block is judged to be still. The flicker judging circuit 5 judges the existence of flicker in accordance with the result SUM$_{nbi}$/AV$_{nbi}$ of the dividing circuit 11 as mentioned above.

This embodiment is effective for video signals obtained from imagers using color filters. FIGS. 6A and 6B show arrangements of color filters for single plate imagers and processing in this embodiment. The arrangement shown in FIG. 6A is for the complementary filter structure and the arrangement shown in FIG. 6B is a portion of Bayer arrangement for primary color filter structure. As shown in FIGS. 6A and 6B, different color filters are arranged and adhered on imagers.

In the complementary color filter type of imager, a first line and a second line are alternately arranged, wherein a cyan filter Cy and a yellow filter Ye are alternately arranged every pixel on the first line and a magenta filter Mg and a green filter are alternately arranged every pixel on the second line. In the integrating the video levels of pixels in two consecutive lines, four pixels surrounded with a chain line are dealt as one block. The video signal level in one block is represented as $$Cy + Mg + Ye + G = 2R + 3G + 2B \approx Y$$

Then, the video signal level in one block provides substantially the same level as the luminance signal. This signal similar to the luminance signal is integrated and the integrated result is used for detecting flicker, so that accurate flicker detection is provided.

In the arrangement shown in FIG. 6B, one line where R and G filters are alternately arranged and another line where G and B filters are alternately arranged. In integration on these two lines, four pixels surrounded by a chain line are dealt as one block and values in a plurality of blocks are integrated. The video signal level in one block is represented as $$R + G + G + B = R + 2G + B \approx Y$$

Thus, the video signal level in one block is substantially the same as the luminance signal Y. This video signal similar to the luminance signal is integrated every a plurality of horizontal lines (two lines), so that accurate flicker detection is provided.

As mentioned above, according to the twelfth embodiment, the integration of video signal levels is effected every area in which flicker components can be considered as substantially the same. Further, the integration results are summed every still portion judging block and the difference between the summing results of the present frame and the previous frame is calculated. Only when the difference is lower than the threshold TH$_1$, the dividing circuit effect dividing. The flicker judging circuit 5 judges the existence of flier in accordance with the dividing result.

In this embodiment, the still portion judging circuit 9 controls the dividing circuit 11. However, the still portion judging circuit 9 may control the flicker judging circuit 5. That is, division is effected irrespective of the still portion judging result. The flicker judging circuit 5 judges (outputs) the existence of flier only when the still portion judging block is judged to be still. Moreover, the outputting result of the flicker judging circuit 5 may be controlled in accordance with the output of the still portion judging circuit 9.

<THIRTEENTH EMBODIMENT>

An illumination flicker detection apparatus according to a thirteen embodiment has substantially the same structure as that of the eleven embodiment. The difference is that a dividing circuit 32 is further provided in the still portion judging unit 15.

Figure 30:
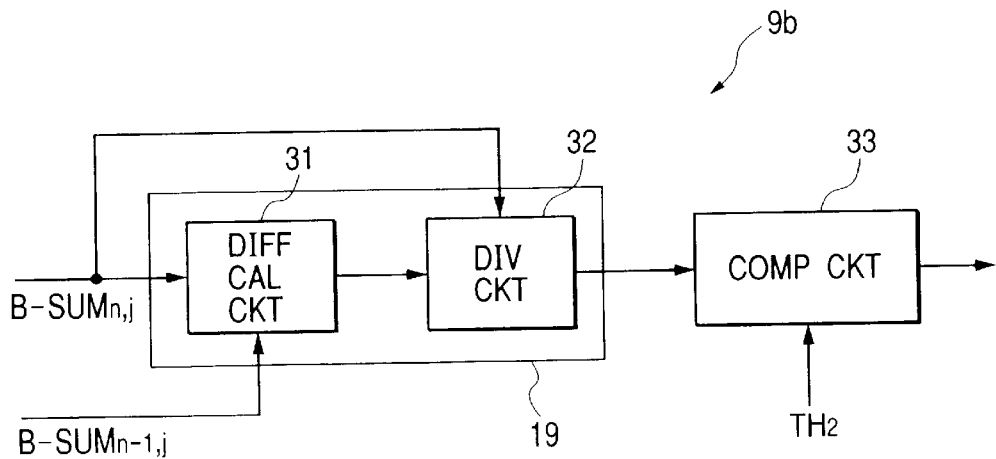
FIG. 30 is a block diagram of the still portion judging circuit according to a thirteen embodiment.

FIG. 30 is a block diagram of the still portion judging circuit 9b. The still portion judging circuit 9b includes a difference calculating circuit 31, a dividing circuit 32, and a comparing circuit 32.

The difference calculating circuit 31 calculates a difference between the summing result B-SUM$_{nj}$ of the present frame and the summing result of the one-frame-previous frame B-SUM$_{n-1j}$. The dividing circuit 32 divides the difference from the difference calculation circuit 31 by the summing result from the summing circuit 7. The dividing result is supplied to the comparing circuit 33. The dividing result is given by:

$$|B\text{-}SUM_{nj} - B\text{-}SUM_{n-1j}|/B\text{-}SUM_{nj}$$

The comparing circuit 33 compares the dividing result with a threshold value TH$_2$. When the dividing result is lower than the threshold value TH$_2$, the $J^{th}$ still portion judging block is judged to be still by the comparing circuit 33. The judging result of the still portion judging unit 15, i.e., the output of the comparing circuit 33 is supplied to the dividing circuit 11. The dividing circuit 11 and the flicker judging circuit 5 judges flicker as similarly as the eleventh embodiment.

In the thirteen embodiment, the ratio between the summing result of the present frame and the one-frame-previous summing result and the ration, that is, the dividing result is compared with the threshold TH$_2$. Thus, though the video signal level varies, accurate still portion judgment is provided, so that the flicker detection can be more accurately provided.

<FOURTEENTH EMBODIMENT>

An illumination flicker detection apparatus according to a fourteen embodiment has substantially the same structure as that of the thirteen embodiment. The difference is that an averaging circuit 41 and a difference calculation circuit 42 are further provided in the still portion judging circuit 9c.

Figure 31:
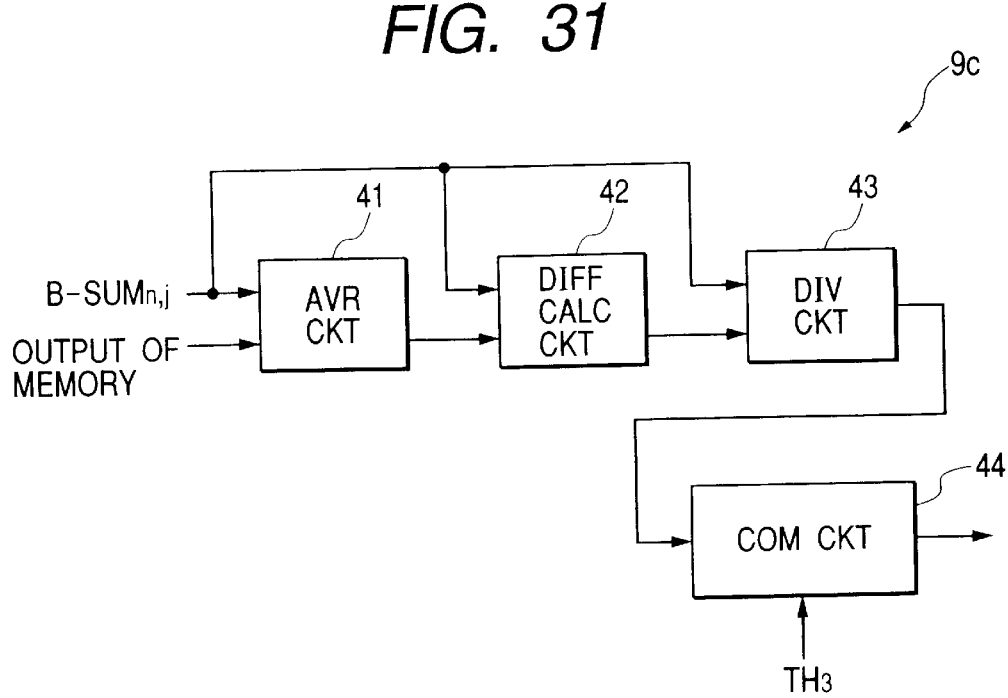
FIG. 31 is a block diagram of the still portion judging unit according to a fourteen embodiment.

FIG. 31 is a block diagram of the still portion judging unit 15 according to the fourteen embodiment. The still portion judging unit 15 includes the averaging circuit 41 for averaging the summing result of the summing circuit 7 and the one-frame-previous summing result and two-frame-previous summing result from the memory 8, the difference calculating circuit 42 for calculating a difference between the summing result of the present frame and the averaging result B-AVE$_{nj}$ of the averaging circuit 41, a dividing circuit 43 for dividing the difference by the summing result of the present frame, and a comparing circuit 44 compares the dividing result from the dividing circuit 43 with a threshold TH3.

The averaging circuit 41 averages the summing result B-SUM$_{nj}$ of the present frame and the one-frame-previous summing result B-SUM$_{n-1j}$ and two-frame-previous summing result B-SUM$_{n-2j}$ from the memory 8 to output an averaging result B-AVE$_{nj}$ which is given by:

$$B\text{-}AVE_{n,j}=(B\text{-}SUM_{nj}+B\text{-}SUM_{n-1j}+B\text{-}SUM_{n-2j})\times 1/3$$

The difference calculating circuit 42 calculates a difference between the summing result B-SUM$_{nj}$ of the present frame and the averaging result AVE$_{nj}$ of the averaging circuit 41. The dividing circuit 43 divides the difference by the summing result B-SUM$_{nj}$ of the present frame. The dividing result is given by:

$$|B\text{-}SUM_{nj}-B\text{-}AVE_{nj}|/B\text{-}SUM_{nj}$$

The comparing circuit 44 compares the dividing result from the dividing circuit 43 with a threshold TH3. When the dividing result is lower than the threshold TH3, the still portion judging unit 15 judges the still portion judging block is still. The judging result of the still portion judging unit 15, i.e., the output of the comparing circuit 44 is supplied to the dividing circuit 11. The dividing circuit 11 and the flicker judging circuit 5 judges flicker as similarly as the eleven embodiment.

In the thirteen embodiment, a ratio between the summing result B-SUM$_{nj}$ of the present frame and the averaging result B-AVE$_{nj}$ derived by averaging the previous frames of summing results and the ratio is compared with the threshold TH3, so that video level of the previous frames to be compared with that of the present frame becomes stable. Thus, the still portion can be more accurately judged. As the result, accuracy of flicker detection at 50 Hz and 60 Hz is improved.

Moreover, in the dividing circuit 43, the difference is divided by the summing result B-SUM$_{nj}$ of the present frame. However, dividing the averaging result B-AVE$_{nj}$ instead the summing result B-SUM$_{nj}$ of the present frame provides the similar effect. Moreover, the averaging circuit 41 may be provided with the circulation type of filter or the FIR filter.

<FIFTEENTH EMBODIMENT>

An illumination flicker compensation signal generation apparatus according to a fifteen embodiment has substantially the same structure as that of the eleven to fourteen embodiments. The difference is that a flicker compensation signal generation circuit 192 is provided in addition to the illumination flicker detection apparatus 190 according to the eleven to fourteen embodiments.

Figure 32:
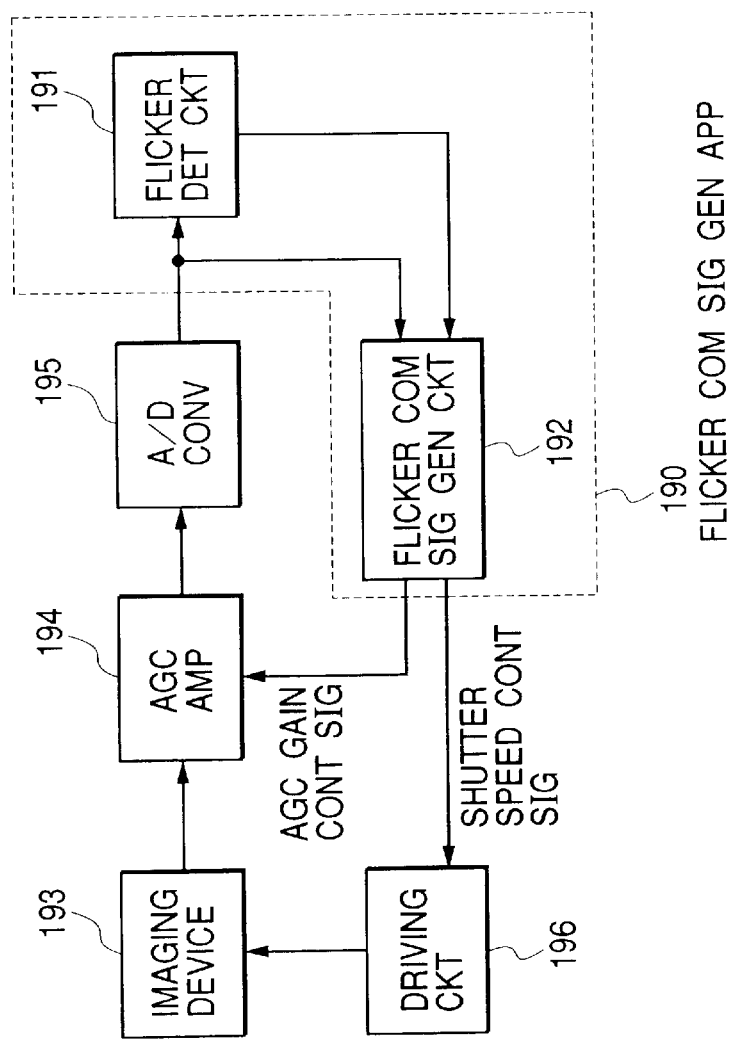
FIG. 32 is a block diagram of the imaging apparatus according to a fifteen embodiment.

FIG. 32 is a block diagram of an imaging apparatus according to the fifteenth embodiment. In FIG. 32, the flicker compensation signal generation apparatus 190 is structured as a portion of the imaging apparatus.

The imaging apparatus includes an imaging device 193 such as MOS type imaging element, an AGC (automatic gain control) amplifier 194, an a/d converter 195, the flicker compensation signal generation apparatus 190, and a driving circuit 196. The flicker compensation signal generation apparatus 190 includes the flicker detection circuit 191 and the flicker compensation signal generation circuit 192.

The imaging device 193 takes an image and generates the video signal. Occasionally, the imaging device 193 takes an image of an object under illumination of which luminance varies with the periodical voltage variation of the ac line. The imaging device 193 is driven by the driving circuit 196. The AGC amplifier 194 amplifies the video signal from the imaging device 193 with its gain controlled in accordance with an AGC gain control signal. The a/d converter 195 converts the video signal from the AGC amplifier 194 into a digital video signal. A flicker detection circuit 191 detects illumination flicker from the digital video signal as mentioned in the eleven to fourteen embodiments. The flicker compensation signal generation circuit 192 performs illumination flicker compensation with the digital video signal from the a/d converter 195 and the detection result of the flicker detection circuit 191 by generating a shutter speed control signal supplied to the driving circuit 196 and the AGC gain control signal supplied to the AGC amplifier 194.

Figure 33:
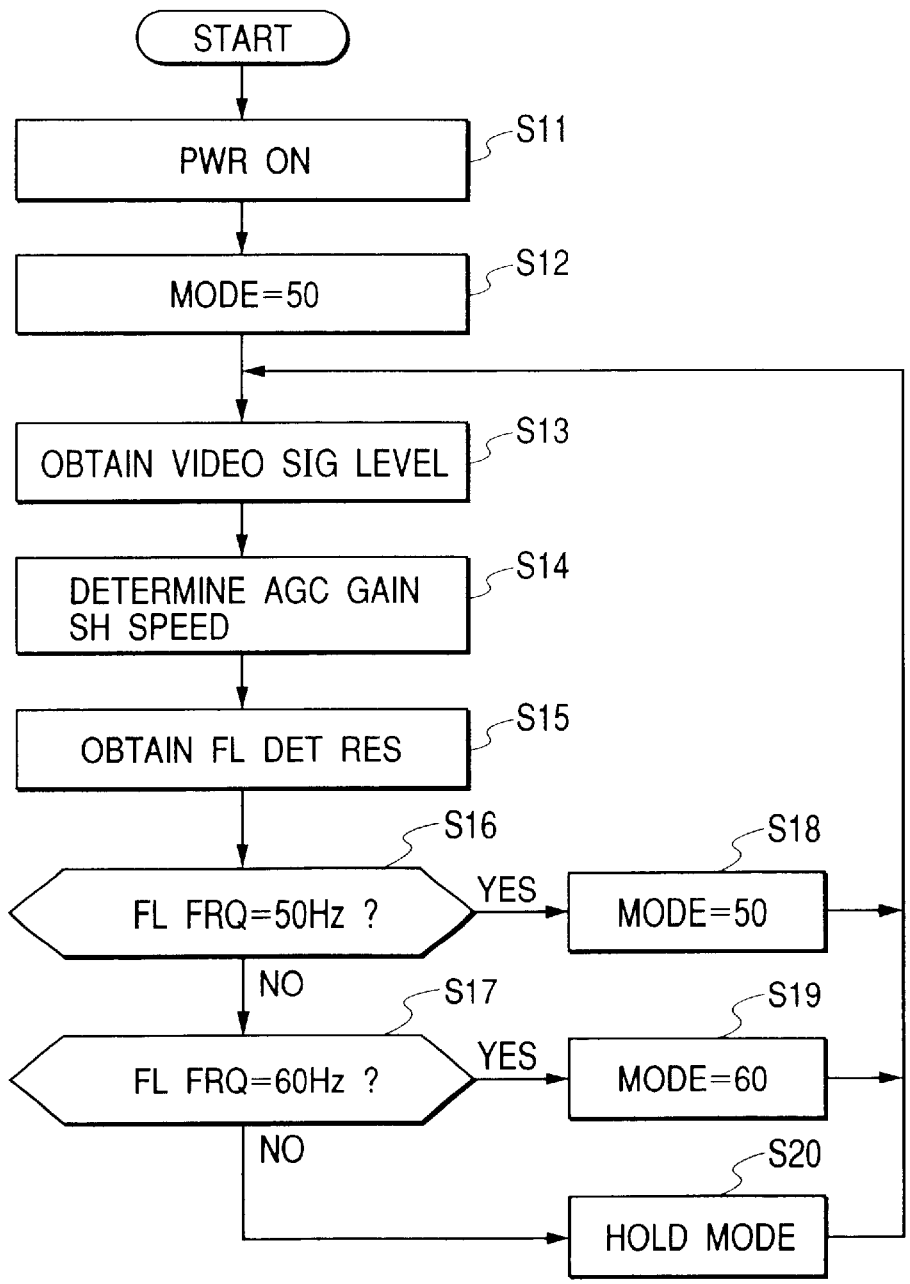
FIG. 33 depicts a flow chart showing operation of the flicker compensation signal generation circuit according to the fifteenth embodiment.

FIG. 33 depicts a flow chart showing the operation of the flicker compensation signal generation circuit 192 according to the fifteen embodiment.

In step s11, when the flicker compensation signal generation circuit 192 detects power-on, the flicker compensation signal generation circuit 192 sets the mode of illumination flicker compensation to 50 Hz in step s12. Next, the flicker compensation signal generation circuit 192 repeatedly executes the operation in the loops including the steps s13 to s20.

In step s13, the flicker compensation signal generation circuit 192 obtains the video level of the digital video signal. In the following step s14, the flicker compensation signal generation circuit 192 determines the AGC gain and the shutter speed and generates the AGC gain control signal and the shutter speed control signal. In step s15, the flicker compensation signal generation circuit 192 obtains the illumination flicker detection result. In the following step s16, the flicker compensation signal generation circuit 192 judges whether the illumination flicker frequency is 50 Hz. If the illumination flicker frequency is 50 Hz, the flicker compensation signal generation circuit 192 sets the mode of illumination flicker compensation to 50 Hz in step s18.

If the illumination flicker frequency is not 50 Hz in step s16, the flicker compensation signal generation circuit 192 judges whether the illumination flicker frequency is 60 Hz in step s17. If the illumination flicker frequency is 60 Hz in step s17, the flicker compensation signal generation circuit 192 sets the mode of the illumination flicker to 60 Hz in step s19. If the illumination flicker frequency is not 60 Hz in step s17, the flicker compensation signal generation circuit 192 holds the mode as it is. After steps s18, s19, and s20, processing returns to step s13.

FIGS. 18A and 18B show the gain controlling and the shutter controlling operation which was also referred in tenth embodiment.

The flicker compensation signal generation circuit 192 controls the shutter speed and the AGC gain as shown in FIGS. 18A and 18B in the 50 Hz mode.

The flicker compensation signal generation circuit 192 obtains brightness in the video image of the digital video signal and determines the AGC gain and the shutter speed in accordance with the detected brightness and the flicker judgment result. In FIG. 18A, "MIN" indicates the minimum value of the AGC gain and the "MAX" indicates the maximum value of the AGC gain.

When brightness is low, the shutter speed is determined in accordance with the frame frequency (e.g., 30 Hz) and the frequency of the ac line voltage (e.g., 50 Hz). Thus, in the low brightness condition, the shutter speed (interval) is 3/100 sec which is the lowest one of values which are integer times a half cycle of the ac line voltage.

With increase in the brightness, the AGC gain is gradually reduced. When the AGC gain reaches the minimum of the AGC gain as shown in FIG. 18A, the flicker compensation signal generation circuit 192 instantaneously changes the shutter speed (interval) to 2/100 sec as shown in FIG. 18B. At the same time, the flicker compensation signal generation circuit 192 changes the shutter speed to 3/2 times the minimum value, wherein "3/2" is an inverse number of the changing rate of the shutter speed. This prevents the rapidly changing in the brightness in the reproduced video image around shutter speed changing instance.

With further increase in the brightness, the AGC gain is gradually reduced again. When the AGC gain reaches the minimum MIN of the AGC gain again, the flicker compensation signal generation circuit 192 instantaneously changes the shutter speed (interval) to 1/100 sec. At the same time, the flicker compensation signal generation circuit 192 changes the shutter speed to twice the minimum value which is an inverse number of the changing rate of the shutter speed.

When the shutter speed reaches the maximum shutter speed without flickering, that is, 1/100 sec in 50 Hz, and the AGC gain is minimum, the shutter speed is increased (shutter interval is reduced) from 1/100 sec. On the other hand, the AGC gain is held. That is, only the shutter speed is controlled for brightness control. Thus, the brightness in the video signal is not saturated, so that the dynamic range can be expanded.

Moreover, favorably, hysteresis is provided between the shutter speed of 1/100 sec and higher shutter speeds (e.g., 1/250 sec).

The operation mentioned above is for the 50 Hz of the ac line. In the case of 60 Hz, the shutter speed is set to values which are integer times the half cycle of the ac line voltage, that is, 2/120 sec, 2/120 sec, 3/120 sec . . .

In the circuit example shown in FIG. 32, the AGC amplifier 194 is provided and the gain controlling is effected in the analog manner. However, it is also possible that a digital AGC control circuit is provided after the a/d converter 195 instead the AGC amplifier 194 and the digital AGC control circuit is controlled in accordance with the AGC gain control signal (data).

In the above-mentioned embodiments, the averaging unit 3d effects averaging with the integrated values of the previous frames. However, it is also possible to average integrated values of previous frames and the present frame.

Moreover, in the above-mentioned embodiments, illumination flicker is detected with MOS type of imager. However, this invention is applicable to the video signal generated from CCD imaging devices.

As mentioned above, according to the illumination flicker detection apparatus and the method of detecting flicker according to eleventh to fifteenth embodiments, it is possible to detect illumination flicker developed during shooting images under illumination by ac line voltage without affection due to luminance level change of an object in the images because the flicker is detected at the portion where the image is judged to be still. Thus, flickers due to 50 Hz ac line voltage and 60 Hz line voltage are automatically detected, respectively. Thus, the flicker compensation is provided.

Moreover, the shutter speed and the AGC gain are controlled in accordance with the video signal level of the inputted video signal and the detected flicker frequency to compensate brightness change due to illumination flicker. Moreover, only the shutter speed is further controlled when the brightness is sufficiently high. This prevents a trouble in the reproduced image when the brightness is high. That is, when an incident light amount increases, shooting the object image at a higher shutter speed prevents saturation in the video level.

<SIXTEENTH EMBODIMENT>

Figure 34:
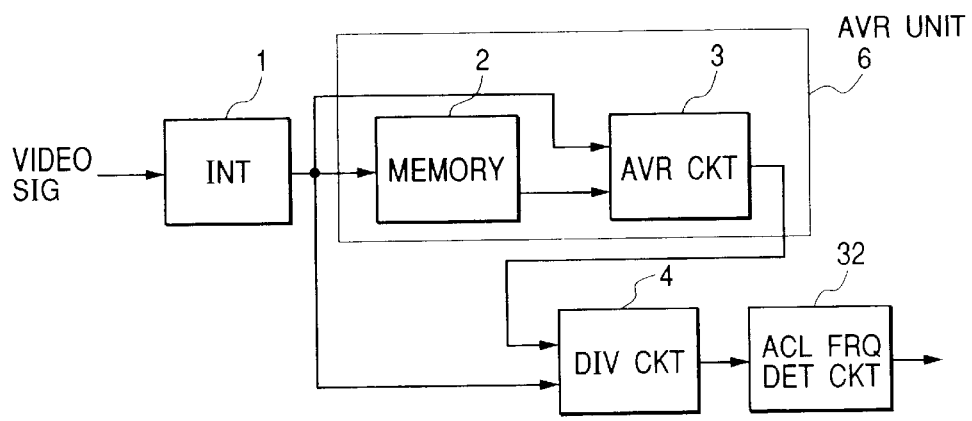
FIG. 34 is a block diagram of the ac line frequency detection apparatus according to a sixteen embodiment.

FIG. 34 is a block diagram of an ac line frequency detection apparatus according to a sixteenth embodiment.

The ac line frequency detection circuit has substantially the same structure as the illumination flicker detection apparatus according to the first embodiment. The difference is that an ac line frequency detection circuit 32 replaces the flicker judging circuit 5.

The ac line frequency detection apparatus includes the integrating circuit 1, the averaging unit 6 including the memory 2 and the averaging circuit 3, the dividing circuit 4, and an ac line frequency detection circuit 32.

A video signal is inputted to the integrating circuit 1. The integrating circuit 1 integrates pixel levels in every horizontal line (nit area) in a frame from the video signal. The memory 2 stores the integration result over a plurality of frames (fields). The averaging circuit 3 averages the integration results of horizontal lines at a plurality of frames (fields) from the integration result from the integrating circuit 1 and the memory 2. The dividing circuit 4 divides the integration results of horizontal lines by the averaged result of horizontal lines, respectively. The ac line frequency detection circuit 32 detects the frequency of an ac line voltage in accordance with the dividing results of horizontal lines.

This ac line frequency detection apparatus is provided with a discrete circuit in this embodiment. However, the ac line frequency detection apparatus is also provided with a Digital Signal Processor (DSP), or a computer with a program.

The video signal is generated by a video camera (not shown in FIG. 1) under illumination of which luminance varies in accordance with the voltage change of the ac line. That is, an image of an object, illuminated by fluorescent lamps, is shot by a video camera.

The integration circuit 1 integrates, accumulates, or averages the pixel levels (luminance level) at every horizontal line. The integrating result of $i^{th}$ line of $n^{th}$ frame is represented by $SUM_{n,i}$ as shown in FIG. 2A. If one frame of the video signal includes 480 horizontal lines, the integration circuit 1 calculates the integration results $SUM_{n,1}$ to $SUM_{n,480}$ for i=1 to 480.

The memory 2 successively stores a predetermined number of frames (fields) of the integration results. The averaging circuit 3 effects addition or averaging among $SUM_{n,i}$ from the integration circuit 1, $SUM_{n-1,i}$, $SUM_{n-2,i}$, and $SUM_{n-3,i}$ from the memory 2. FIG. 2B shows the summing or averaging operation from the integration results of the present frame and the previous frames. The memory 2 stores the integration result $SUM_{n,i}$ and outputs the integration results $SUM_{n-1, i}$, $SUM_{n-2,i}$, $SUM_{n-3,i}$ at the $i^{th}$ line at frames n−1 to n−3. The averaging circuit 3 averages (sums) $SUM_{n,i}$, $SUM_{n-1,i}$, $SUM_{n-2,i}$, and $SUM_{n-3,i}$. The averaging result is represented as $AVE_{n,i}$. In this embodiment, the number of the previous frames per one unit averaging operation is three. However, it is also possible that, at least, the integration results of more than one previous frames are added to the integration result of the present frame.

The dividing circuit 4 obtains $SUM_{n,i}/AVE_{n,i}$ through calculation from the output $SUM_{n,i}$ of the integration circuit 1 and the output $AVE_{n,i}$ of the averaging circuit 3a. The flicker judging circuit 5 judges whether there is flickering with the dividing result of the dividing circuit 4.

The ac line frequency detection circuit 32 judges the existence of illumination flicker in the video signal generated with illumination using the ac line voltage and detects frequency of the ac line from the feature of the variation in the result of the dividing circuit 4. More specifically the ac line frequency detection circuit 32 detects the ac line frequency by analyzing the waveform of the variation in the result of the dividing circuit 4.

Figure 35:
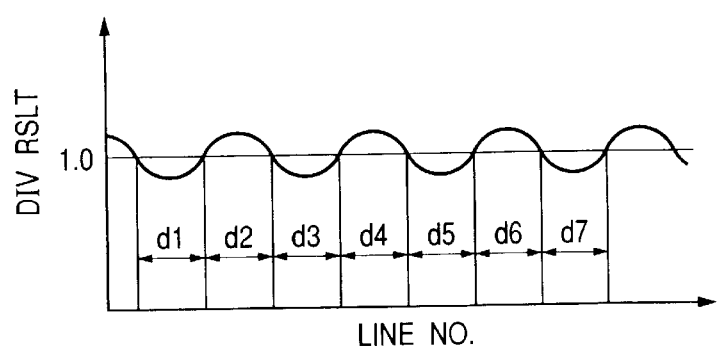
FIG. 35 is a graphical drawing illustrating ac line frequency operation according to the sixteen embodiment.
Figure 36:
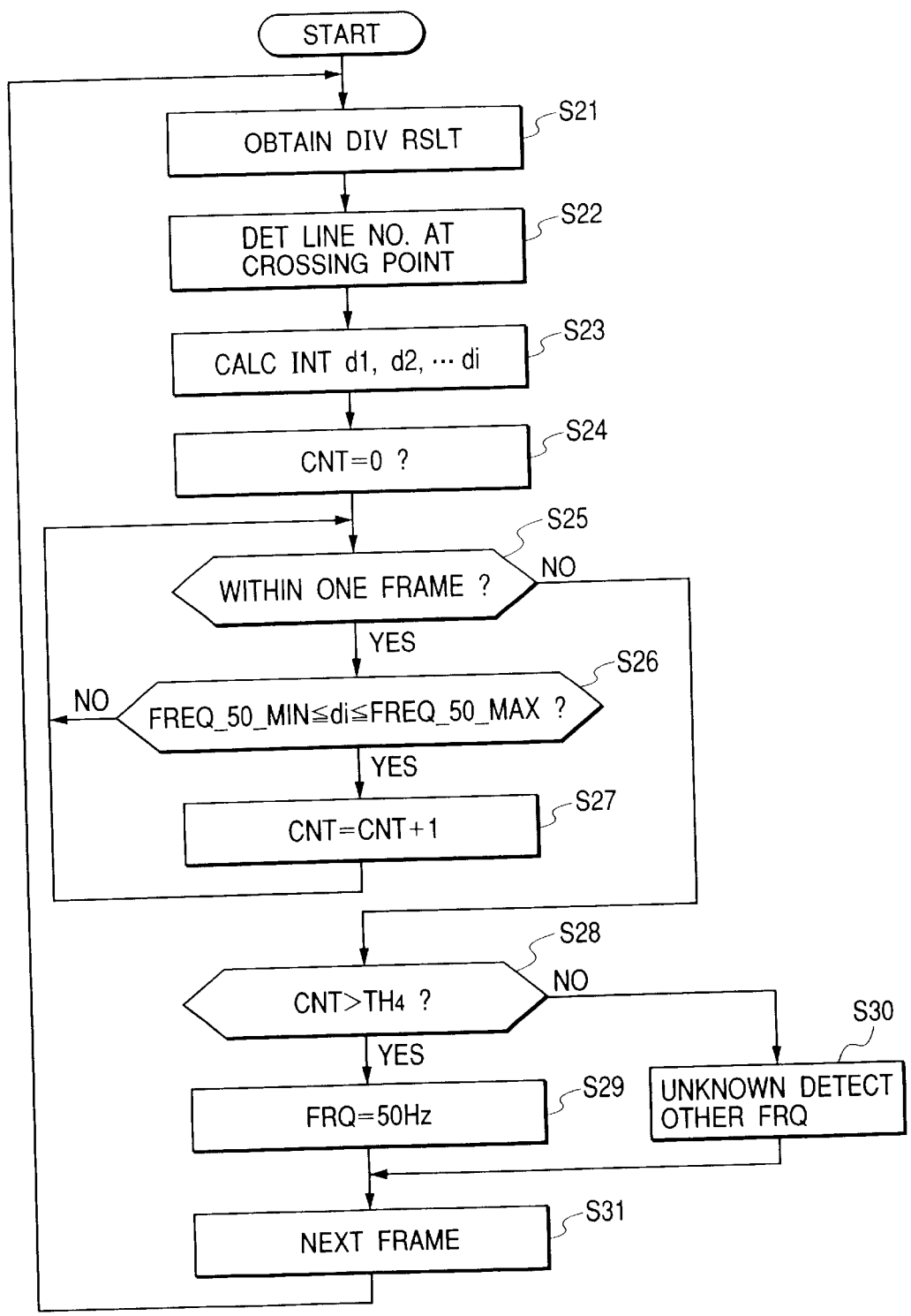
FIG. 36 depicts a flow chart showing ac line frequency operation according to the sixteen embodiment.

FIG. 35 is a graphical drawing illustrating the ac line frequency operation according to the sixteenth embodiment. FIG. 36 depicts a flow chart showing the ac line frequency operation according to the sixteenth embodiment.

The ac line frequency detection circuit 32 obtains the dividing result from the dividing circuit 4 in step s21. Next, the ac line frequency detection circuit 32 detects crossing points di (i=1 . . . ) at which the variation in the division result crosses level 1.0 in step s22. The ac line frequency detection circuit 32 calculates intervals (the number of lines in the interval) between the two consecutive crossing points (d1 and d2, d2 and d3 . . . ) in step s23 as shown in FIG. 35.

In the following step s24, the ac line frequency detection circuit 32 resets its count CNT to zero. Next, the ac line frequency detection circuit 32 judges whether each of interval includes a half of lines corresponding to one cycle of flicker component to judge that the flicker frequency is developed by the ac line voltage of 50 Hz in steps 25 and 26.

Here, the theoretical number of the horizontal lines corresponding to one cycle of the flicker component is calculated from the frame frequency, the number of horizontal lines per frame, and the ac line frequency.

In step 26, the ac line frequency detection circuit 32 judges that the interval includes a half of horizontal lines corresponding to one cycle of the flicker component of 50 Hz when the number of horizontal lines lies within an allowable range from FREQ 50 MIN to FREQ 50 MAX to provide tolerance.

If the interval includes a half of horizontal lines corresponding to one cycle of the flicker component of 50 Hz, the ac line frequency detection circuit 32 increments its count CNT in step s27 and processing returns to step s25 to repeat the operation in steps s25 to s27 for all lines in one frame.

In step s25, if all intervals of crossing points within one frame have been judged, processing proceeds to step s28.

In step s28, the ac line frequency detection circuit 32 compares the counts CNT with a threshold $TH_4$ in step s28. If the count CNT is higher than the threshold $TH_4$, the ac line frequency detection circuit 32 judges that there is flicker of 50 Hz in this frame in step s29. If the count CNT is not higher than the threshold $TH_4$, the ac line frequency detection circuit 32 judges that there is no flicker of 50 Hz in this frame in step s30 and detects that there is other flicker (for example, 60 Hz) as similar to the operation represented by steps s21 to s29.

After processing in steps s29 and s30, the ac line frequency detection circuit 32 returns to step s21 through the step s31 to repeat the above-mentioned operation of the next frame.

As mentioned above, the video levels of pixels at a frame of the video signal generated with illumination varying with the ac line voltage variation are integrated. The integrated results of frames, including the present frame, are averaged with respect to corresponding horizontal lines. The integration result of each line is divided by the averaging result of each line. The ac line frequency is judged from the frequency analyzing the variation in the dividing results. Thus, the ac line frequency measurement is possible without directly detecting the ac line voltage or ac current from an ac outlet.

Moreover, because the judgment is effected using the average between a plurality of frames, the ac line frequency is accurately measured without affection of luminance level variation due to movement of an object in the screen of the video signal.

<SEVENTEENTH EMBODIMENT>

Figure 37:
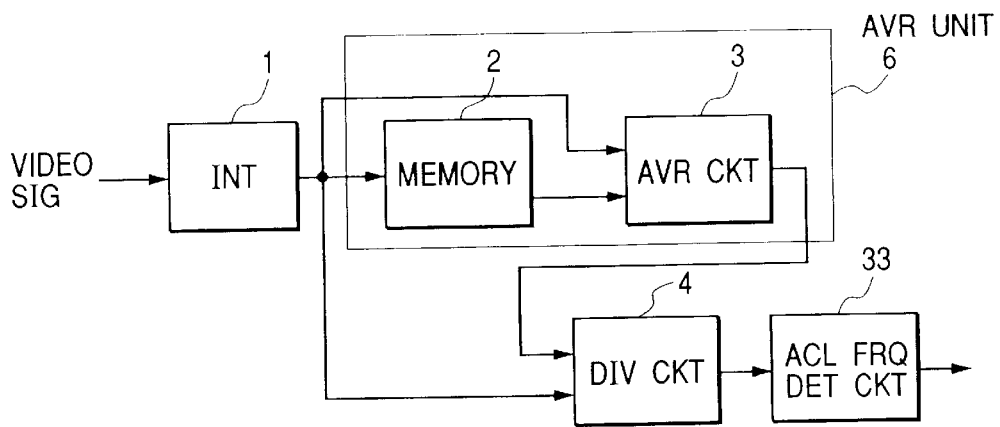
FIG. 37 is a block diagram of the ac line frequency detection apparatus according to a seventeen embodiment.

FIG. 37 is a block diagram of an ac line frequency detection apparatus according to a seventeenth embodiment.

The ac line frequency detection apparatus has substantially the same structure as that according to the sixteenth embodiment. The difference is that an ac line frequency detection circuit 33 replaces the ac line frequency detection circuit 32.

Figure 38:
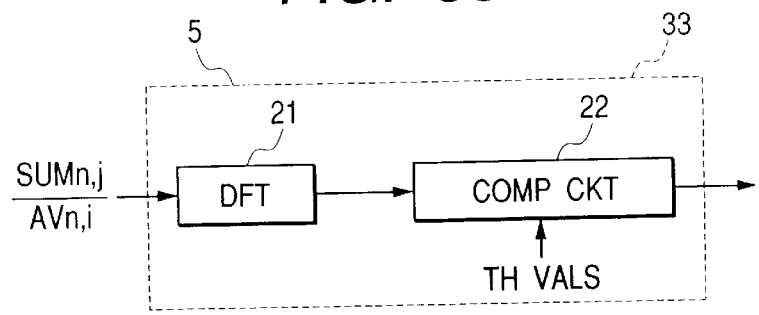
FIG. 38 is a block diagram of the ac line frequency detection circuit shown in FIG. 37.

FIG. 38 is a block diagram of the ac line frequency detection circuit 33.

The ac line frequency detection circuit 33 includes the DFT (Discrete Fourier Transform) circuit 21, supplied with the division result $SUM_{n,i}/AV_{n,i,\ for\ detecting\ frequency}$ component levels and the comparing circuit 22 for comparing the output of the DFT circuit 21 with threshold values.

The DFT circuit 21 supplied with the division result $SUM_{n,i}/AV_{n,i}$ and the comparing circuit 22 for comparing the output of the DFT circuit 21 with threshold values.

FIG. 4A shows the output of the dividing circuit 4, wherein the axis of abscissas represents line number at a frame and the axis of ordinates represents levels of dividing results, that is, $SUM_{n,i}/AV_{n,i}$. The dividing results shows flicker.

FIG. 4B shows the output of the DFT circuit 21, wherein the axis of abscissas represents frequency and axis of ordinates represents levels of frequency components.

The DFT circuit 21 effects Discrete Fourier Transform operation to output frequency components as shown in FIG. 4B from the division result of the division circuit 4.

The line $F_{50}$ represents the level of the DFT circuit 21 at 50 Hz, i.e., component of 50 Hz and the line $F_{60}$ represents the level of the DFT circuit 21 at 60 Hz, i.e., component of 60 Hz.

The comparing circuit 22 compares the results $F_{50}$ and $F_{60}$ of the DFT circuit 21 with threshold levels $TH_{50\text{-}ON}$, $TH_{60\text{-}ON}$, $TH_{50\text{-}OFF}$, and $TH_{60\text{-}OFF}$. There are relations, $TH_{50\text{-}ON} > TH_{50\text{-}OFF}$ and $TH_{60\text{-}ON} > TH_{60\text{-}OFF}$.

Basically, the comparing circuit 22 compares the component $F_{50}$ with the threshold levels $TH_{50\text{-}ON}$ and $TH_{50\text{-}OFF}$ and the component $F_{60}$ with the threshold levels $TH_{60\text{-}ON}$ and $TH_{60\text{-}OFF}$ to detect flicker in the video signal.

More specifically, the comparing circuit 22 judges the flicker as follows:

When (the value of) $F_{50} < TH_{50\text{-}OFF}$ and (the value of) $F_{60} < TH_{60\text{-}OFF}$, the comparing circuit 22 judges that there is no flicker.

When $\alpha \times F_{60} < F_{50}$ and $F_{50} > TH_{50\text{-}ON}$, the comparing circuit 22 judges there is flicker of 50 Hz.

When $\beta \times F_{50} < F_{60}$ and $F_{60} > TH_{60\text{-}ON}$, the comparing circuit 22 judges there is flicker of 60 Hz.

In other cases, the comparing circuit 22 judges that it is unknown that there is flicker.

In the above equations, $\alpha$ is a weighting coefficient for flicker detection of 50 Hz and $\beta$ is a weighting coefficient for flicker detection of 60 Hz. These coefficients are sufficiently greater than one, so that if the frequency component $F_{50}$ ($F_{60}$) is greater than the value of the weighting-coefficient-times the frequency component $F_{60}$ ($F_{50}$), the comparing circuit 22 judges there is flicker of 50 Hz (60 Hz). This reduces probability of erroneous judgment of existence of flicker due to luminance level change within a frame representing an image.

As mentioned above, according to this embodiment, the existence of flicker is judged from the average of integration values over a plurality of frames (fields) including the present frame at the corresponding lines. Thus, the flicker detection can be provided without affection of luminance level variation due to motion of the image. Moreover, this structure (this method) provides illumination flicker detection of 60 Hz wherein luminance level variation.

In this embodiment, the integration circuit 1 integrates the pixel values every horizontal line. However, it is also possible that the integration circuit 1 integrates the pixel value on thinned horizontal lines, wherein thinning period is sufficiently shorter than the period of flicker (beat) component. In this case, the circuit stage after the integration circuit 1 effects the above-mentioned operation for the thinned horizontal lines. Thus, the capacity of the memory 2b can be reduced.

According to this embodiment, the ac line frequency detection apparatus includes the DFT circuit 21 and the comparing circuit 22, so that the presence of illumination flicker at one of various ac line frequencies can be detected substantially at the same time.

<EIGHTEENTH EMBODIMENT>

Figure 39:
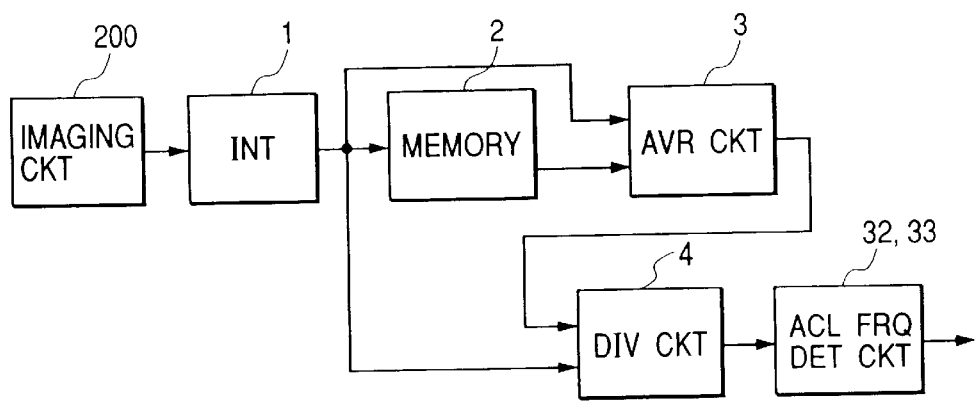
FIG. 39 is the ac line frequency detection apparatus according to an eighteen embodiment.

FIG. 39 is an ac line frequency detection apparatus according to an eighteenth embodiment. The ac line frequency detection apparatus according to the eighteenth embodiment has substantially the same structure as that according to the sixteenth embodiment or the seventeenth embodiment. The difference is that an imaging circuit 200 is further provided. The imaging circuit 200 includes an imaging element and a driving circuit (not shown). The imaging circuit 200 generates and supplies the video signal to the integrating circuit 1. The memory 2, the averaging circuit 3, dividing circuit 4, and the ac line frequency detection circuit 32 (33) detect ac line frequency as mentioned above. Thus, the ac line frequency detection apparatus according to the nineteenth embodiment can indirectly detect the existence of illumination flicker and the frequency of the illumination flicker from the image without directly detecting the ac line voltage or ac line current from the ac outlet. Moreover, because the ac line frequency detection apparatus according to the eighteenth embodiment includes the imaging circuit, so that there is no necessity of a unit generating the video signal and the cable for supplying the video signal to the integrating circuit 1.

What is claimed is:

1. An illumination flicker detection apparatus comprising:
   integrating means for integrating levels of a video signal at pixels at each of unit areas included in a frame or field of said video signal;
   averaging means for averaging said integrated level at each of said unit areas at said frame or field and said integrated level at the corresponding unit area at an adjacent previous frame or field;
   dividing means for effecting division between results of said averaging and integrating means every unit area; and
   flicker judging means for judging whether flicker exists in said video signal by frequency-analyzing results of said dividing means at said unit areas and outputting a judging result.

2. An illumination flicker detection apparatus as claimed in claim 1, wherein said unit area is a horizontal line.

3. An illumination flicker detection apparatus as claimed in claim 1, wherein said unit area is a plurality of adjacent horizontal lines where variation in said levels due to said flicker is negligible.

4. An illumination flicker detection apparatus as claimed in claim 1, wherein each of said unit areas includes a plurality of horizontal lines with interval at a frame, said horizontal lines showing the same phase in flicker component in said video signal.

5. An illumination flicker detection apparatus as claimed in claim 1, wherein said averaging means comprising a circulation type of filter.

6. An illumination flicker detection apparatus as claimed in claim 1, wherein said averaging means comprising a Finite Impulse Response filter.

7. An illumination flicker detection apparatus as claimed in claim 1, further comprising:
   first summing means for summing said result of said integrating means at said frame or field and said result of said integrating means at another frame or field at every said unit area; and
   second summing means for summing said results of said averaging means at said frame or field and said result of said averaging means at said another frame or field at every unit area, wherein said another frame or field is prior to said frame or field by a predetermined number of frames or fields which is determined by a frequency of said flicker and a frame frequency of said video signal and said dividing means effects said division between said results of first and second summing means.

8. An illumination flicker detection apparatus as claimed in claim 1, further comprising:
   first summing means for summing said results of said integrating means of a predetermined number of adjacent frames or fields at every unit area, said adjacent frames or fields including said frame or field; and
   second summing means for summing said results of said averaging means of said adjacent frames or fields at every unit area, wherein said dividing means effects said division between said results of first and second summing means.

9. An illumination flicker detection apparatus as claimed in claim 1, further comprising another averaging means for averaging said results of said dividing means at a plurality of said unit areas at said frame or field, wherein each of said unit areas includes a plurality of horizontal lines with interval at a frame, said horizontal lines showing the same phase in flicker component in said video signal.

10. An illumination flicker detection apparatus as claimed in claim 1, further comprising threshold level generating means for generating a threshold level in accordance with a shutter speed control signal which is used for generating said video signal, wherein said flicker judging means judges whether said flicker exists in said video signal using said threshold level.

11. An illumination flicker compensation signal generation apparatus comprising:
   integrating means for integrating levels of a video signal at pixels at each of unit areas included in a frame or field of said video signal;
   averaging means for averaging said integrated level at each of said unit areas at said frame or field and said integrated level at the corresponding unit area at an adjacent frame or field;
   dividing means for effecting division between results of said averaging and integrating means every unit area;

flicker judging means for judging whether flicker exists in said video signal by frequency-analyzing results of said dividing means at said unit areas and outputting a judging result; and flicker compensation means for generating a shutter speed control signal and an automatic gain controlling signal for generating said video signal in accordance with said judging result of said flicker judging means to compensate flicker in said video signal.

12. A method of detecting flicker in a video signal comprising the steps of:
   (a) integrating video levels of a video signal at pixels at each of unit areas included in a frame or field of said video signal;
   (b) averaging said integrated level at each of said unit areas at said frame or field and said integrated level at the corresponding unit areas at an adjacent frame or field;
   (c) effecting division between results of said steps of (a) and (b) every unit area; and
   (d) judging whether flicker exists in said video signal by frequency-analyzing results of said step (c) at said unit areas and outputting a judging result.

13. A method as claimed in claim 12, wherein said unit area is a horizontal line.

14. A method as claimed in claim 12, wherein said unit area is a plurality of adjacent horizontal lines where variation of said video levels due to said flickering is negligible.

15. A method as claimed in claim 12, wherein each of said unit areas includes a plurality of horizontal lines with interval at a frame, said horizontal lines showing the same phase in flicker component in said video signal.

16. A method as claimed in claim 12, wherein said step (b) comprises step of:
   circulating said integrated level every frame or field with a coefficient less than one.

17. A method as claimed in claim 12, wherein said step (b) comprises the steps of:
   Finite-impulse-Response-filtering said integrated level.

18. A method as claimed in claim 12, further comprising:
   (e) summing said result of said step (a) at said frame or field and said result of said step (a) at another frame or field at every said unit area; and
   (f) summing said results of said averaging step at said frame or field and said result of said step (b) at another frame or field at every unit area, wherein said another frame or field is prior to said frame or field by a predetermined number of frames or fields which is determined by a frequency of said flicker and a frame frequency of said video signal and said dividing means effects said division between said results of said steps (e) and (f).

19. A method as claimed in claim 12, further comprising:
   (e) summing said results of said step (a) of a predetermined number of adjacent frames or fields at every unit area, said adjacent frames or fields including said frame or field; and
   (f) summing said results of said step (b) of said adjacent frames or fields at every unit area, wherein said division is effected between said results of said step (e) and (f).

20. A method as claimed in claim 12, further comprising the step of averaging said results of said step (c) of a plurality of said unit areas at said frame or field, wherein each of said unit areas includes a plurality of horizontal lines with interval at a frame, said horizontal lines showing the same phase in flicker component in said video signal.

21. A method as claimed in claim 12, further comprising the steps of:
   generating a threshold level in accordance with a shutter speed control signal which is used for generating said video signal, wherein it is judged whether said flicker exists in said video signal using said threshold level.

22. A method of compensating flicker in a video signal comprising the steps of:
   (a) integrating video levels of a video signal at pixels at each of unit areas included in a frame or field of said video signal;
   (b) averaging said integrated level at each of said unit areas at said frame or field and said integrated level at the corresponding unit areas at an adjacent frame or field;
   (c) effecting division between results of said steps of (a) and (b) every unit area; and
   (d) judging whether flicker exists in said video signal by frequency-analyzing results of said step (c) at unit areas and outputting a judging result; and
   (e) generating a shutter speed control signal and an automatic gain controlling signal in accordance with said judging result of said step (d) to compensate flicker in said video signal.

23. An illumination flicker detection apparatus comprising:
   integrating means for integrating levels of a video signal at pixels at each of unit areas included in a frame or field of said video signal;
   averaging means for averaging said integrated level at each of said unit areas at said frame or field and said integrated level at the corresponding unit area at an adjacent frame or field;
   still portion judging means for judging whether image at every block including a portion of said unit areas at a frame is still in accordance with result of said integrating means;
   dividing means for effecting division between results of said averaging and integrating means every unit area; and
   flicker judging means for judging whether flicker exists in said video signal in accordance with results of said dividing means and said still portion judging means.

24. An illumination flicker detection apparatus as claimed in claim 23, wherein said unit area is a horizontal line.

25. An illumination flicker detection apparatus as claimed in claim 23, wherein said unit area is a plurality of adjacent horizontal lines where variation of said video levels due to said flickering is negligible.

26. An illumination flicker detection apparatus as claimed in claim 23, wherein said blocks are arranged in the vertical direction at a frame or a field, a vertical length of each block is determined in accordance with an integer times one cycle of illumination variation due to an ac line voltage, used for generating said video signal and a frame frequency of said video signal, and said still portion judging means comprises:
   summing means for summing integration results of unit areas at every said block;
   variation detection means for detecting variation in result of said summing means between each of said blocks of the present frame or field and the corresponding block of a previous frame or field; and
   comparing means for comparing said variation with a threshold value, wherein said still portion judging means judges that image at each of said blocks is still when said variation is lower than said threshold value.

27. An illumination flicker detection apparatus as claimed in claim 26, wherein said variation detection means comprises:
difference calculation means for calculating a difference in results of said summing means between each of said blocks of the present frame or field and the corresponding block of a previous frame or field;
dividing means for dividing result of said difference calculating means by said result of said summing means of said present frame or field; and
comparing means for comparing result of said dividing means with a threshold value, wherein said still portion judging means judges that image at each of said blocks is still when said result of said dividing means is lower than said threshold value.

28. An illumination flicker detection apparatus as claimed in claim 26, wherein said variation detection means comprises:
variation detection averaging means for averaging results of said summing means between present and previous frames or fields at each of said blocks;
difference calculation means for calculating a difference in result of said summing means and said result of said variation detection averaging means;
dividing means for dividing result of said difference calculating means by said result of said summing means of said present frame or field; and
comparing means for comparing result of said dividing means with a threshold value, wherein said still portion judging means judges that image at every block areas is still when said result of said dividing means is lower than said threshold value.

29. An illumination flicker compensation signal generation apparatus comprising:
integrating means for integrating levels of a video signal at pixels at each of unit areas included in a frame or field of said video signal;
averaging means for averaging said integrated level at each of said unit areas at said frame or field and said integrated level at the corresponding unit area of at least an adjacent frame or field;
still portion judging means for judging whether image at every block including a portion of said unit areas at a frame is still in accordance with result of said integrating means;
dividing means for effecting division between results of said averaging and integrating means every unit area; and
flicker judging means for judging whether flicker exists in said video signal in accordance with results of said dividing means and said still portion judging means; and
flicker compensation means for generating a shutter speed control signal and an automatic gain controlling signal for generating said video signal in accordance with said judging result of said flicker judging means to compensate flicker in said video signal.

30. A method of compensating flicker in a video signal comprising the steps of:
(a) integrating levels of a video signal at pixels at each of unit areas included in a frame or field of said video signal;
(b) averaging said integrated level at each of said unit areas at said frame or field and said integrated level at the corresponding unit area at an adjacent frame or field;
(c) judging whether image at every block including a portion of said unit areas is still in accordance with result of said step (a);
(d) effecting division between results of said steps of (a) and (b) every unit area; and
(e) judging whether flicker exists in said video signal in accordance with results of said steps (c) and (d).

31. A method as claimed in claim 30, wherein said unit area is a horizontal line.

32. A method as claimed in claim 30, wherein said unit area is a plurality of adjacent horizontal lines where variation of said video levels due to said flickering is negligible.

33. An illumination flicker detection apparatus as claimed in claim 30, wherein said blocks are arranged in the vertical direction at a frame or a field, a vertical length of each block is determined in accordance with an integer times one cycle of illumination variation due to an ac line voltage, used for generating said video signal, and said step (c) comprises the steps of:
(f) summing integration results of unit areas at every said block;
(g) detecting variation in result of said step of (f) between each of said blocks of the present frame or field and the corresponding block of a previous frame or field; and
(h) comparing said variation with a threshold value, wherein in said step (c), it is judged that image at each of said blocks is still when said variation is lower than said threshold value.

34. An illumination flicker detection apparatus as claimed in claim 33, wherein said step (g) includes the steps of:
(i) calculating a difference in results of said step of (f) between each of said blocks of the present frame or field and the corresponding block of a previous frame or field;
(j) dividing result of said step (i) by said result of said step (f) of said present frame or field; and
(k) comparing result of said step (j) with a threshold value, wherein in said step (c) it is judged that image at each of said blocks is still when said result of said step (j) is lower than said threshold value.

35. A method as claimed in claim 33, wherein said step (g) includes the steps of:
(i) averaging results of said step of (f) between present and previous frames or fields at each of said blocks;
(j) calculating a difference in result of said step of (f) and said result of said step (b);
(k) dividing result of said step (j) by said result of said step (f) of said present frame or field; and
(l) comparing result of said step (k) with a threshold value, wherein in said step (c), it is judged that image at every block areas is still when said result of said step (k) is lower than said threshold value.

36. A method of compensating flicker in a video signal comprising the steps of:
(a) integrating levels of a video signal at pixels at each of unit areas included in a frame or field of said video signal;
(b) averaging said integrated level at each of said unit areas at said frame or field and said integrated level at the corresponding unit area at an adjacent frame or field;
(c) judging whether image at every block including a portion of said unit areas is still in accordance with result of said step (a);

(d) effecting division between results of said steps of (a) and (b) every unit area; and (e) judging whether flicker exists in said video signal in accordance with results of said steps (c) and (d); and (f) generating a shutter speed control signal and an automatic gain controlling signal for generating said video signal in accordance with said judging result of said step (e) to compensate flicker in said video signal.

37. An ac line frequency detection apparatus comprising:

flicker component detection means for detecting a flicker component in a video signal generated with illumination of which luminance varies with ac line voltage; and flicker judging means for judging whether flicker exists in said video signal in accordance with said detected flicker component and outputting the judging result;

wherein said flicker component detection means comprises:
   integrating means for integrating levels of said video signal at pixels at each of unit areas included in a frame or field of said video signal;
   averaging means for averaging said integrated level at each of said unit areas at said frame or field and said integrated level at the corresponding unit area at an adjacent frame or field;
   dividing means for effecting division between results of said averaging and integrating means every unit area to output said detected flicker component.

38. An ac line frequency detection apparatus as claimed in claim 37, wherein said flicker judging means comprises:
   variation analyzing means for analyzing variation of said detected flicker component with respect to horizontal lines.

39. An ac line frequency detection apparatus as claimed in claim 37, wherein said flicker judging means comprises: spectrum analyzing means for analyzing spectrum of said flicker component.

40. An ac line frequency detection apparatus as claimed in claim 37, wherein said each unit area is a horizontal line.

41. A method of measuring an ac line frequency comprising the steps of:

(a) detecting a flicker component in a video signal generated with illumination of which luminance varies with ac line voltage; and (b) judging whether flicker exists in said video signal in accordance with said detected flicker component;

wherein said step (a) comprising steps of:
   integrating levels of said video signal at pixels at each of unit areas included in a frame or field of said video signal;
   averaging said integrated level at each of said unit areas at said frame or field and said integrated level at the corresponding unit area of at an adjacent frame or field;
   effecting division between results of said averaging and integrating steps every unit area to output said detected flicker component.

42. A method as claimed in claim 41, wherein said step (b) comprising steps of:
   analyzing variation of said detected flicker component with respect to horizontal lines.

43. A method as claimed in claim 41, wherein said step (b) comprising steps of:
   analyzing spectrum of said flicker component.

44. A method as claimed in claim 41, wherein said each unit area is a horizontal line.

* * * * *

UNITED STATES PATENT AND TRADEMARK OFFICE
CERTIFICATE OF CORRECTION

PATENT NO. : 6,710,818 B1
DATED : March 23, 2004
INVENTOR(S) : Misa Kasahara et al.

It is certified that error appears in the above-identified patent and that said Letters Patent is hereby corrected as shown below:

Column 11,
Line 17, change "$(1+2p)^{th}$" to -- $(j+2p)^{th}$ --.
Line 19, delete "$j^{th}$" and change "$(1+1+2p)^{th}$" to -- $(j+1+2p)^{th}$ --.

Signed and Sealed this

Twenty-seventh Day of December, 2005

JON W. DUDAS
*Director of the United States Patent and Trademark Office*